United States Patent [19]

Samuel

[11] 4,332,985
[45] Jun. 1, 1982

[54] AUTOMATIC CALLING METHODS AND APPARATUS

[75] Inventor: Richard I. Samuel, Westfield, N.J.

[73] Assignee: Jayem Dialer Corp., Westfield, N.J.

[21] Appl. No.: 134,951

[22] Filed: Mar. 28, 1980

[51] Int. Cl.³ ............................................ H04M 1/274
[52] U.S. Cl. ............................. 179/90 BD; 179/90 B; 179/18 B; 179/18 BA
[58] Field of Search ............ 179/90 B, 90 BD, 18 BA, 179/18 B, 2 DP, 2 CA, 84 VF, 18 D

[56] References Cited

U.S. PATENT DOCUMENTS

| | | | |
|---|---|---|---|
| 3,334,190 | 8/1967 | Jenkins et al. | 179/18 BA |
| 3,600,522 | 8/1971 | Benson | 179/18 BA |
| 3,694,583 | 9/1972 | Budrys et al. | 179/18 BA |
| 3,702,905 | 11/1972 | Gil | 179/18 BA |
| 3,993,877 | 11/1976 | Sendyk et al. | 179/90 B |
| 4,061,885 | 12/1977 | Nash et al. | 179/84 VF |
| 4,119,810 | 10/1978 | Marin et al. | 179/90 B |
| 4,171,469 | 10/1979 | Brooks | 179/90 B |
| 4,232,200 | 11/1980 | Hestad et al. | 179/90 B |

FOREIGN PATENT DOCUMENTS 1057862  2/1967  United Kingdom ........... 179/18 BA

OTHER PUBLICATIONS

"User's Guide to the SPC Sprintdialer", a Publication of SPCommunications, One Adrian Ct., P.O. Box 974, Burlingame, Ca.

Primary Examiner—Gerald L. Brigance
Attorney, Agent, or Firm—Lerner, David, Littenberg & Samuel

[57] ABSTRACT

Automatic calling systems and methods therefor are provided in accordance with the teachings of the present invention wherein automatic dialing apparatus is connected in parallel with one or more telephone lines within a subscriber's system. Any telephone handset connectable to that telephone line may enter a code on the telephone line to cause the automatic dialing apparatus to become operative to initiate dialing of a predetermined telephone number or portion thereof. When such telephone number comprises an access code for a private leased line subscriber system, the automatic dialing apparatus will also subsequently issue digit information corresponding to the subscriber's billing code. While capable of being implemented in dial modes, the automatic dialing apparatus employed within the instant invention preferably accomplishes automatic dialing by way of issuing DTMF codes regardless of the manner in which it is selectively enabled so that connection with a leased line system appears to be initiated by a DTMF system. Depending upon the embodiment considered, one or more telephone lines within a subscriber's system may be serviced and codes entered at handsets for the purpose of enabling the automatic dialing apparatus may take the form of initial ones of the telephone number to be automatically dialed or input codes to which local telephone equipment does not respond may be employed.

48 Claims, 7 Drawing Figures

AUTOMATIC CALLING METHODS AND APPARATUS

BACKGROUND OF THE INVENTION

This invention relates to automatic calling systems and more particularly to apparatus and methods for automatically accessing subscriber line systems through a switched telephone network.

Long distance subscriber systems which compete with the established telephone company's long distance service have now gained wide acceptance. Typically, these systems employ the local switched telephone lines of the established telephone company to connect a subscriber with a computer which then acts to convey the subscriber's call over separately owned long distance microwave networks or the like to a local area where the call is again reintroduced into the local switch telephone network where the same is completed to the location dialed. In such subscriber systems, a user at the subscriber's premises must initially enter a seven digit local telephone number to gain access over the local switched telephone network to a computer which controls the long distance network to be employed. The computer answers the lines and indicates that access has been gained by placing a tone on the line. Upon heating the tone, the user enters a five digit billing code and, thereafter, dials the area code and the phone number of the remote location with which communication is desired. All told, to complete a call over such a computer controlled long distance system, a user at a subscriber's site must input or dial some twenty-two digits in a manner timed to accomodate necessary handshaking with the computer controlling the long distance system. This is time consuming, annoying and often inhibits use.

While automatic dialing equipment, repertory dialers, and the like are well known as exemplified by U.S. Pat. Nos. 3,600,522, 3,694,583, 4,008,380 and 4,126,768, these devices contemplate attachment either to individual telephone sets within a system, or attachment as part of a private telephone system within a subscriber's location or at a central office which provides switching for the telephone system. Many subscriber locations, however, do not comprise large switched private systems but instead take the form of locations having a plurality of telephone lines and a plurality of extensions wherein each such extension has access to several, if not all, of the telephone lines serving that site. For this reason, automatic dialing systems or repertory dialers configured to form a part of a large in-house private switched telephone system do not admit of use with such subscriber's locations and, conversely, the provision of an automatic dialing unit for each extension is excessively costly especially when the same is not cost justified by substantial use.

Subscriber use of separately owned long distance telephone systems also have the attendant disadvantages of being subject to employee abuse and many may not be employed in conjunction with telephone systems where the subscriber has not updated his system from rotary dials to Touch-Tone (a trademark registered to AT&T) or DTMF (Dual Tone Multifrequency) pads. Thus, once an employee has learned the requisite seven digit access code for the computer controlling the private leased line system and his employers billing code therefor, such employee may frequently use the same for his own purposes at locations other than his place of employment. Under these circumstances, it will be appreciated that, while any employer's telephone system is subject to employee abuse, such abuse can usually be controlled within reasonable metes and bounds if use is limited to the work environment. However, once an employee is capable of removing access to such service to a private area, such as the employees home, the subscriber is subject to a much greater degree of abuse. Similarly, since a subscriber's justification for engaging separately owned long distance systems are principally economic, the same may not be reasonably justified if retention of the service imposes an attendant requirement that the subscriber update his telephone service from rotary dials to DTMF pads.

Separately owned long distance subscriber networks are permitted to operate in conjunction with local, telephone company provided service on the basis that the same do not interfere in any manner with the local telephone networks with which they actually interface. More particularly, when a subscriber dials the seven digit code, he effectively employs the telephone system provided by the switched telephone lines to place a local call to a computer controlling the long distance system. The computer then answers and provides a tone, by way of handshaking, so that a user at the subscriber's site may then enter the five digit billing code to identify the subscriber and, thereafter, the area code and the local number to be dialed. The computer acts in response to the area code dialed to transmit the long distance call over the long distance lines maintained for that purpose and reenters the telephone system at a location where the telephone number dialed represents either a local call or a toll call of minor proportion. Thus, in this manner, the separately owned long distance subscriber service provided in no way interferes with the switched telephone networks provided by the telephone companies involved since both entrance and egress to and from the separate system are provided through equipment furnished by the telephone company. There are no special interfaces or equipments provided at the subscriber's office and all actions taken by a user at the subscriber's location occur in a normal mode of use of the telephone system and, in no manner, interferes by way of interface or signal with conventional telephone company equipment. Therefore, it will be readily appreciated by those of ordinary skill in the art that the maintenance of this relationship wherein neither the subscriber nor the company furnishing the separate long distance service introduces any equipment which might adversely effect or otherwise interfere with the normal functions of the switched telephone network is highly desirable and, in fact, is mandated by tariff requirements. Hence, while the provision of automatic dialing equipment to relieve the onerous task of dialing some or all of the twelve digits required for access to a separate long distance system would be highly desirable, the same may in no way interfere with the operation of local telephone equipment and, in a subscriber's location which takes the form of a normal telephone company installation or a comparable system, the same may not require extensive installation of equipment which may interfere with the operation of the subscriber's equipment in either specialized or normal modes of operation nor may such equipment cause a dedication of the subscriber's systems to the operational modes thereof.

Therefore, it is an object of the present invention to provide automatic calling systems and methods therefor for facilitating use of subscriber long distance systems operated through a switched line telephone network.

A further object of this invention is to provide automatic calling systems and methods therefor actuated by entry of code information from a user's handset which code information does not adversely effect the operation of local telephone equipment.

An additional object of this invention is to provide automatic calling systems and methods therefor for use with a subscriber long distance system which does not interfere with the normal operation of telephone equipment when the automatic calling system is not in use.

Another object of this invention is to provide automatic calling systems and methods therefor which are selectively enabled from a user's handset by entry of code information forming a part of the telephone number to be dialed.

A further object of this invention is to provide automatic calling systems and methods therefor which are selectively enabled from a user's handset by entry of code information which is applied to the local telephone system but to which the local telephone system will not respond.

An additional object of this invention is to provide automatic calling systems and methods therefor whose use in conjunction with a separate long distance system which does not require access and billing code information to be disclosed to a user.

Another object of the present invention is to provide automatic calling systems and methods therefor enabling subscriber locations employing rotary dial equipment to provide DTMF codes to a private leased line long distance system.

A further object of the present invention is to provide automatic calling systems and methods therefor suitable for connection to any existing subscriber system without extensive modification of such system.

Various other objects and advantages of the present invention will become clear from the following detailed description of several exemplary embodiments thereof and the novel features will be particularly pointed out in conjunction with the claims appended hereto.

SUMMARY OF THE INVENTION

In accordance with the teachings of the present invention, automatic calling systems and methods therefor are provided wherein automatic dialing apparatus is connected in parallel with one or more telephone lines within a subscriber system. Any telephone handset connectable to that telephone line may enter a code on the telephone line to cause said automatic dialing apparatus to become operative to initiate dialing of a predetermined telephone number. When such telephone number comprises an access code for a separate long distance subscriber system, the automatic dialing apparatus will also subsequently issue digit information corresponding to the subscriber's billing code. While capable of being implemented in dial modes, the automatic dialing apparatus employed within the instant invention preferably accomplishes automatic dialing by way of issuing DTMF codes regardless of the manner in which it is selectively enabled so that connection with a separate long distance system appears to be initiated by a DTMF system. Depending upon the embodiment considered, one or more telephone lines within a subscriber's system may be serviced and codes entered at handsets for the purpose of enabling said automatic dialing apparatus may take the form of initial ones of the telephone number to be automatically dialed or input codes to which local telephone equipment does not respond.

BRIEF DESCRIPTION OF THE DRAWINGS

The invention will be more clearly understood by reference to the following detailed description of several exemplary embodiments thereof in conjunction with the accompanying drawings in which:

FIG. 7 is a functional flow diagram illustrating the manner in which the embodiment of the invention illustrated in FIG. 3 automatically issues billing code information under program control.

DETAILED DESCRIPTION

Although the instant invention is of general application and is useful in conjunction with any telephone service employing one or more telephone lines as well as one or more extensions thereto, the present disclosure shall take place under conditions where it is assumed that it is desired to access a conventional separately owned, long distance subscriber service from a subscriber's office employing a plurality of telephone lines as well as a plurality of extension telephones wherein each extension has access to each telephone line. Furthermore, conventional access requirements to separately owned long distance leased line subscriber system will be assumed in that a user at a subscriber's office desiring access thereto is normally required to input the seven digit telephone number associated with the service, await response by the computer as indicated by a dial tone and, thereafter, input a five digit billing code which is followed by the area code and local number of the location to which a telephone call is to be placed. While these conditions have been assumed for purposes of setting forth the instant disclosure, it will be readily appreciated by those of ordinary skill in the art, as the instant disclosure proceeds, that any destination codes may be automatically produced by the automatic calling system according to the instant invention and that the automatic calling systems and methods therefor disclosed herein may be readily employed in conjunction with not only multiline and multiextension user arrangements provided by the telephone company but, in addition thereto, the same may be utilized with large or small scale user systems taking the form of either those conventionally provided by the telephone company or the various private systems which are available.

Figure 1:
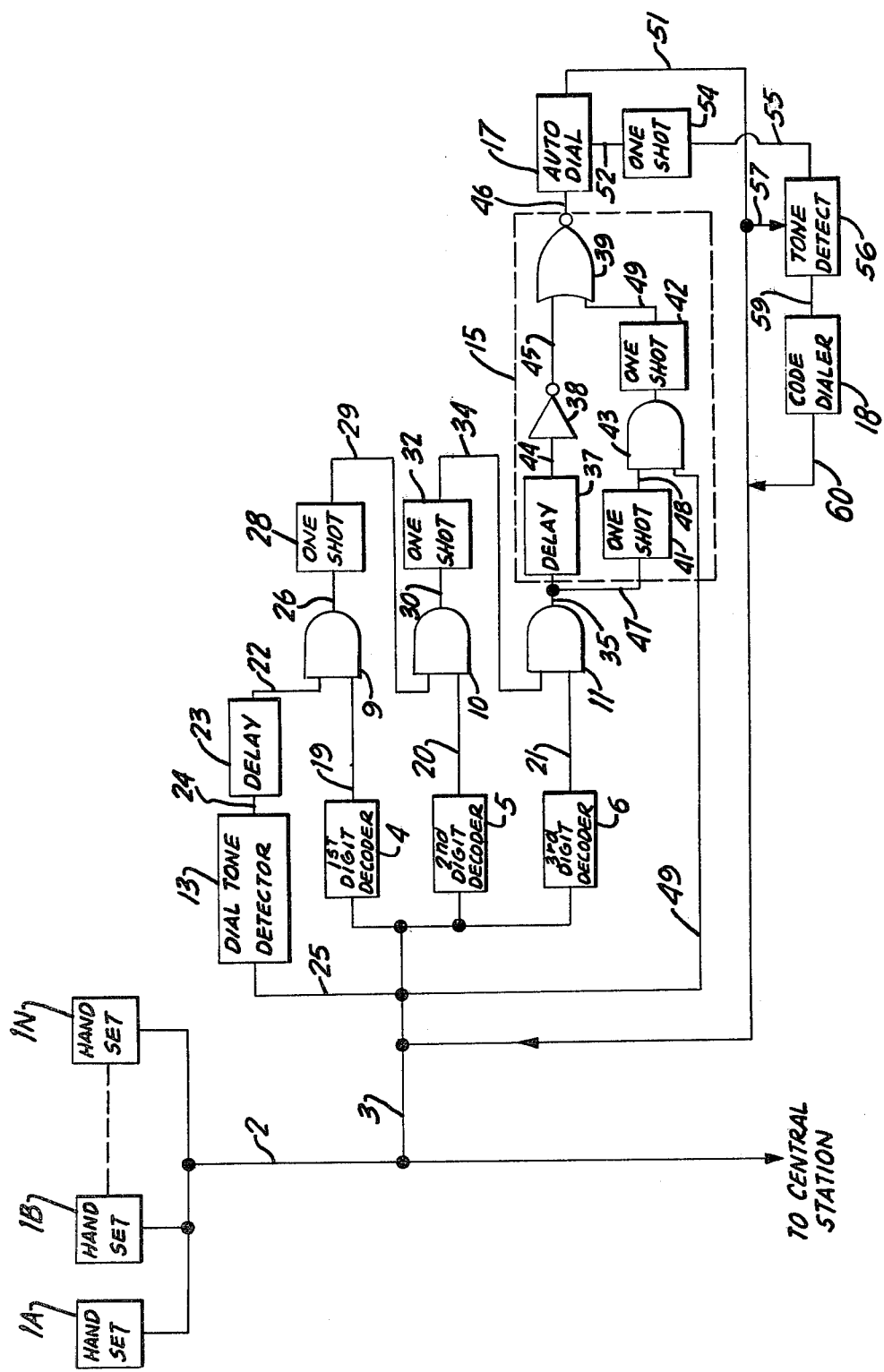
FIG. 1 is a block diagram serving to schematically illustrate one embodiment of the automatic calling system according to the present invention wherein initial digits of the telephone number to be dialed serve to enable an automatic dialing operation.

Referring now to the drawings and more particularly to FIG. 1 thereof, there is shown a block diagram serving to schematically illustrate one embodiment of the automatic calling system according to the present invention wherein initial digits of the telephone number to be dialed serve to enable an automatic dialing operation with respect to the remaining digits of such telephone number to be dialed. The embodiment of the automatic calling system illustrated in FIG. 1 comprises first, second and third digit decoders 4–6, a plurality of AND gates 9–11, dial tone detector means 13, last digit detector means indicated by the dashed block 15 and auto dialers 17 and 18. The automatic calling system according to the instant invention is connected to a subscriber's telephone equipment which here takes the form of a plurality of DTMF handsets as aforesaid although, as will be readily appreciated by those of ordinary skill in the art, the instant invention is fully applicable to rotary dial equipment. Each of the subscriber's handsets 1A–1N are connected in the manner indicated to a central station through a conventional telephone line 2. In the embodiment of the invention being disclosed, the subscriber's equipment is illustrated as including one line and, should more than one line be employed for purposes of connecting with a computer controlled long distance subscriber system, each such line would include an automatic calling system of the type illustrated in the embodiment of the invention illustrated in FIG. 1. This criteria would also apply to the embodiment of the invention illustrated in FIG. 2 while the embodiment of the invention illustrated in FIG. 3 may serve and monitor a plurality of telephone lines.

Each of the first, second and third digit decoders 4–6 is connected in parallel to the telephone line 2 through a conductor 3. The first, second and third digit decoders 4–6 may take the conventional form of DTMF pair detectors which act in the well known manner to detect the presence of the well defined sum frequency of the two tones which result when each digit of a DTMF pad is depressed. Thus, as is well recognized by those of ordinary skill in the art, if a conventional 3×4 DTMF pad is employed with each of the handsets 1A–1N, the same will exhibit the following column and row frequencies:

A1 = 1209 HZ
A2 = 1336 HZ
A3 = 1477 HZ
B1 = 697 HZ
B2 = 770 HZ
B3 = 852 HZ
B4 = 941 HZ wherein the A designation corresponds to columns from left to right and the B designation corresponds to rows numbered from top to bottom. Thus, each digit of the DTMF array provided, when depressed, in effect causes the generation of the column and row frequencies assigned to its matrix location so that, in effect, the sum of the tones is placed on the telephone line 2 for detection at the central station. These sum tones are also applied through the conductor 3 to the first, second and third digit decoders 4–6 which act to determine the presence of a specific sum tone, as is assigned thereto, on the line.

In the case of the embodiment of the invention illustrated in FIG. 1, the first, second and third digit decoders 4–6 would each be assigned to detect the presence of the first three digits of the telephone number employed to dial the computer. These may be the same digits or different digits depending upon the exchange involved and, as will be appreciated by those of ordinary skill in the art, the first, second and third digit decoders 4–6 are designed to detect the specific tones assigned to these digits as applied to the telephone line 2. Thus, if the access code was 333, each of the first, second and third digit decoders 4–6 would be designed to detect the sum frequency resulting from the depression of the three button of a DTMF pad which resides at the intersection of column A3 and row B1 or, alternately, should a 654 access code be employed, the first digit decoder 4 would be designed to detect the presence of the sum tone resulting from a depression of the six button, the second digit decoder 5 would be designed to determine the presence of the sum tone which results from the depression of a five button on the DTMF pad and the third digit decoder 6 would be designed to detect the presence of the sum tone associated with the depression of the four button on the DTMF pad. Whenever any of the first, second or third digit decoders 4–6 ascertain the presence of the sum frequency assigned thereto, a high level output is provided at the output thereof.

The output of each of the first, second and third digit decoders 4–6 is connected through the conductors 19–21 to one input of the AND gates 9–11, respectively. Each of the plurality of AND gates 9–11 may take the conventional form of this well known class of device which acts to produce a high at the output thereof when both of the inputs thereto are high while producing a low at the output thereof under all other input conditions. The function of the plurality of AND gates 9–11, as shall be seen below, is to sequentially gate appropriate outputs from the first, second and third digit decoders 4–6 in a sequential manner as determined as a function of the presence of a preceding event which is sequentially appropriate for the decoding sequence being carried out.

Thus, the second input to the AND gate 9 is connected through conductor 22, delay means 23, conductor 24, dial tone detector means 13 and conductor 25 to the telephone line 2 through the conductor 3. This acts, as will be appreciated by those of ordinary skill in the art, to establish a decoding condition for AND gate 9 such that dial tone must be detected prior to the detection of the presence of the first digit as assigned to the first digit decoder 4.

More particularly, when one of the handsets 1A–1N is lifted from its cradle by a user and dial tone is acquired on the telephone line 2, this dial tone is applied through the conductors 3 and 25 to the dial tone detector 13 as well as each of the first, second and third digit decoders 4–6. The dial tone detector means 13 may take any of the well known forms of this conventional class of device as typified, for example, by the dial tone detector means employed in conventional Data Sets, provided by the telephone company. Upon a detection of dial tone by the dial tone detector means 13, the output thereof, as applied to conductor 24, will go high. The output of the dial tone detector means 13 is connected through the conductor 24 to the delay means 23. The delay means 23 may take the conventional form of an R.C. delay circuit or the like having a delay cycle of from 0.5 to 1 seconds and acts, in a manner well known to those of ordinary skill in the art, to assume a high output condition after the delay interval thereof has expired and to maintain this high level for the delay interval thereof after the high level has terminated. Upon termination of its delay cycle and loss of an input signal, delay means 23 reverts to a reset condition where the output thereof as applied to conductor 22 is low. The relatively long delay cycle selected for the delay means 23 is designed to accommodate the normal delay between the users lifting of a handset 1A-1N and the acquisition of dial tone prior to the depression of the first button on the DTMF pad and thereafter the depression of a button on the pad. As will be readily appreciated by those of ordinary skill in the art, the delay cycle of the delay means 23 may be varied as appropriate to accommodate any attendant delays which normally occur at a user's location between the acquisition of dial tone and the depression of a button at the DTMF pad. It should also be noted, as will be appreciated by those of ordinary skill in the art, that a monostable flip-flop having a shortened duty cycle associated therewith may be substituted for the delay means 23 as a technique for locking out the automatic calling system according to the instant invention should this be desired. In any event, it will be appreciated by those of ordinary skill in the art that, when a handset is lifted and dial tone is acquired on the telephone line 2, this condition will be detected by the dial tone detector means 13. This, in turn, will cause a high to be present at the output of the delay means 23 after the expiration of the delay cycle thereof to place a high on the output thereof which is connected to a first input of the AND gate 9. Furthermore, this high will persist for a period equal to the delay cycle after the operator has depressed a button on the DTMF pad. Thus, the dial tone detector means 13, the delay means 23 and the conductor 22 establish a high level at a first input to AND gate 9 for a requisite 0.5 to 1 second interval after a button on the DTMF pad is depressed so that, upon a detection of a requisite sum tone by the first digit decoder 4, the high produced at the output thereof connected to conductor 19 will cause the output of the AND gate 9 to go high indicating that dial tone has been detected and a first button on the DTMF pad corresponding to the first number of the three digit exchange code designed to trigger the automatic calling system according to the instant invention has been entered.

The output of the AND gate 9 is connected through conductor 26 to the input of the one shot 28. The one shot 28 may take any conventional form of monostable multivibrator which acts in the well-known manner to produce a high at the output thereof once triggered for the predetermined duty cycle thereof and then reverts to a low output state. The one shot 28 would typically exhibit a duty cycle of from three to five seconds so that when the output of AND gate 9, as connected to conductor 26, goes high to trigger one shot 28, this high would be maintained at the output of one shot 28 for a requisite interval to allow the user to enter the second digit of the three digit code. The output of one shot 28 is connected through conductor 29 to the input of AND gate 10 to establish the initial conditions therefor as a prerequisite for the detection of a second exchange digit entered at the DTMF pad by the second digit decoder means 5. Thus, it will be appreciated by those of ordinary skill in the art that, when the input to AND gate 10 as connected to conductor 29 goes high, the system will already have detected the presence of dial tone followed by the entry of the first digit assigned to the first digit decoder means 4.

The AND gate 10 acts, as aforesaid, to produce a high on the output thereof connected to the conductor 30 when both of the inputs thereto, as connected to conductors 29 and 20, go high. This condition occurs only after dial tone has been detected and followed by a detection of the first digit code by the first digit decoder means 4, as aforesaid, to maintain a high on the input connected to conductor 29 for the duty cycle of the one shot 28. With this prerequisite established, the detection of the presence of the second digit of the exchange code by the second digit decoder means 5 will result in the output of the AND gate 10 on conductor 30 going high. This output is applied to the one shot 32 which may take precisely the same form as described for the one shot 28. Thus, once triggered by the high on input 30, one shot 32 will produce a high at the output thereof connected to conductor 33 for the duty cycle thereof. The output of the one shot 32 is applied through conductor 34 to one input of AND gate 11 and is indicative, as will now be readily appreciated by those of ordinary skill in the art, that dial tone has been acquired and the first and second digits of the exchange code have been detected by the first and second digit decoders 4 and 5 in the requisite sequence. The second input to AND gate 11 is connected to the third digit decoder 6 through the conductor 21 and hence the AND gate 11 will produce a high at the output thereof connected to conductor 35 only once the third digit of the three digit exchange code has been decoded by the third digit decoder means 6 subject to the acquisition of dial tone and a decoding of the first and second digits of such exchange code in the requisite sequence. Hence, once the output of AND gate 11 goes high, the three digits of the exchange code appropriate for actuating the automatic calling system of the instant invention have been entered and initial conditions appropriate for the triggering of the automatic calling system are established.

However, in order to allow the handsets 1A-1N to be employed for conventional telephone calls to exchanges having the same exchange digits as that assigned to trigger the automatic calling system according to the instant invention as decoded in sequence by the first, second and third digit decoders 4-6, the system next checks to ascertain whether or not additional digit information has been entered. If such information has been entered, the user is merely dialing a normal telephone call to the same exchange associated with the first, second and third digit decoders 4-6 and the automatic calling system is not to be initiated. Of course, if the first, second and third digit decoders 4-6 do not detect the requisite exchange number, the subscriber system which is to be automatically dialed is not being called and hence the automatic calling system is not triggered whereupon handsets may be utilized in the traditional manner.

The function of detecting whether or not the third digit of the exchange sequence corresponds to the last number entered by the operator or is part of a normal seven digit code is performed by the last digit detector means indicated by the dashed block 15 and is, in effect, accomplished by ascertaining whether or not a fourth digit is entered onto the telephone line 2 within a predetermined interval after the designated three digit sequence associated with digit decoders 4–6 has been detected. More particularly, the last digit detector means 15 is connected to the output of the AND gate 11 through conductor 35 and comprises delay means 37, inverter means 38, NOR gate means 39, first and second one shots 41 and 42 and AND gate 43. The delay means 37 may take the form of a conventional RC delay circuit or, alternatively, solid state equivalents thereto may be employed. The delay exhibited by the delay means 37 may typically comprise the same interval as the duty cycles for one shots 28 and 32 or be slightly extended as the function thereof is to delay the application of the output of AND gate 11 to the auto dialer means 17 until a sufficient interval has expired to insure that no fourth digit has been entered by the user onto the telephone line 2. Upon the expiration of the delay inserted by the delay means 37, a high at the input thereto on conductor 35 will be applied through conductor 44 to the inverter 38. The inverter 38 may take any of the conventional forms of this well known class of device which acts to produce the compliment of the input supplied thereto on conductor 44 to the output thereof on conductor 45. The output of the inverter 38 is applied through conductor 45 to one input of the NOR gate 39. The NOR gate 39 may take any of the well known forms of this conventional logic device and acts in the well known manner to produce a high at the output thereof connected to conductor 46 only when both of the inputs thereto are low. A high output on conductor 46 will trigger the auto dialer means 17.

The output of AND gate 11 as applied to conductor 35 is also applied through conductor 47 to the input of one shot 41. The one shot 41 may take the same form of monstable multivibrator having the same duty cycle as previously described in conjunction with one shots 28 and 32 and it should be noted that the duty cycle of one shot 41 should correspond to the delay interval associated with the delay means 37 although the timing is not highly critical. The output of the one shot 41 is connected through conductor 48 to one input of AND gate 43.

The AND gate 43 may take the same form as any of AND gates 9–11 and acts in the well known manner to produce a high at the output thereof only when both of the inputs thereto go high. As will now be appreciated by those of ordinary skill in the art, the input to AND gate 43 on conductor 48 goes high any time dial tone and the first three digits of the selected exchange number have been detected by the digit decoders 4–6 and will stay high for the interval associated with the duty cycle of one shot 41. A second input to the AND gate 43 is connected through conductors 49 and 3 to the telephone line 2. The purpose of the second input to AND gate 43 is to receive a high level associated with a signal on the telephone line 2. Due to the input conditions associated with one shot 41, it will be appreciated by those of ordinary skill in the art that both inputs to AND gate 43 can go high only at such time as three appropriate digits of the exchange number have been detected and at least a fourth digit has been entered by a user. This means the output of AND gate 43 will only go high if a fourth digit has been entered after the entry of the desired exchange number which the automatic calling system according to the instant invention is set to detect. The output of AND gate 43 is connected to the input of one shot 42. The one shot 42 may take the same form of monstable multivibrator described in conjunction with the one shots 28 and 32 but here would typically exhibit a duty cycle of approximately four seconds. The function of the one shot 42 is to apply a high on conductor 49 any time a fourth digit has been entered by the user after the exchange number has been entered and to hold this high as an input to NOR gate 39 until well after the delay associated with delay means 37 has expired. If not high output is provided by the AND gate 43, the input to NOR gate 39 on conductor 49 will stay low.

In operation of the last digit detector means indicated by the dashed block 15, it will be seen that when dial tone and the first three selected digits of the exchange code have been detected, the output of AND gate 11 on conductor 35 will go high. This will be delayed by delay means 37 and, due to the presence of inverter 38, the input to the NOR gate 39 on conductor 45 will stay high for the interval associated with the delay means 37. The high level on conductor 35 will also be applied to the one shot 41 which will enable the input to AND gate 43 on conductor 48. If, during this interval, a fourth digit is applied to the telephone line 2, the same will be applied to the lower input to AND gate 43 connected to conductor 49. If this occurs, the output of AND gate 43 will go high to trigger one shot 42 so that a high is applied on the input 49 to NOR gate 39 for the four second interval associated with the duty cycle thereof. Thus, if it is assumed that the appropriate exchange code has been detected, the input to NOR gate 39 on conductor 45 will be high for the one and one-half second duration of the delay means 37 and then will go low. If, during this inverval, no fourth digit is detected on the phone line the input to NOR gate 39 on conductor 49 will stay low and hence, upon the expiration of the delay associated with the delay means 37, the input to NOR gate 39 on conductor 45 will go low whereupon a high will be applied by NOR gate 39 to conductor 46 to trigger the auto dialer 17. However, should any fourth digit be detected on conductor 49 during the interval of the delay associated with the delay means 37, the operation of AND gate 43 and one shot 42 will clamp the input to NOR gate 39 on conductor 49 high so that, upon expiration of the delay associated with the delay means 37, the output of NOR gate 39 will stay low to inhibit triggering of the auto dialer means 17. Therefore, it will be appreciated by those of ordinary skill in the art that a high is produced at the output of the last digit detector means 15 only upon a detection of dial tone and the first three digits of the selected exchange code under conditions where no fourth digit is entered upon the line.

The auto dialer means 17 and 18, while separately shown to facilitate a description of the embodiment of the invention illustrated in FIG. 1, preferably comprises a single unit and may take any of the well known forms of this conventional class of device. For instance, a tone generator and read only memory arranged so that, when the same is actuated, digital codes corresponding to the digits for which tones are to be generated are serially applied to the tone generator in the sequence in which the same are to be generated may be employed. Furthermore, it should be understood that, in the case being described wherein the automatic calling system embodied in FIG. 1 is devoted to the purposes of contacting a separate long distance subscriber system, the four digits associated with the dial code to contact the system would be issued by the auto dialer indicated by the block 17 while the digits corresponding to the billing code for the subscriber would be issued by the code dialer indicated by block 18. In actuality, the sets of digits would be stored in a read only memory and would be serially read to a tone generator as a pair of sequences, the first such sequence is initiated by the presence of a high on conductor 46 representing the output of the last digit detector means 15 and the second sequence would be subsequently issued in a manner timed to correspond to the manner in which the code dialer 18 is described as being initiated. Thus, when the output of the last digit detector means 15 as applied to conductor 46 is actuated, the auto dialer means 17 is actuated whereupon the remaining four digits of the DTMF code for contacting the computer controlling the private long distance leased line system are generated and applied to the conductor 51 for subsequent application through conductor 3 to the telephone line 2. Accordingly, it will be seen that, while the first three digits of the exchange code were dialed by a user, the remaining four digits of the access code are automatically dialed by the auto dialer means 17 and applied to the telephone line through conductors 51 and 3.

While automatic dialers employing DTMF generation have been illustrated as employed herein, it will be appreciated that rotary dial type signals generated through the selective application of on-hook and off-hook signals applied to the line may also be employed for purposes of achieving automatic dialing. This would be utilized, however, only where the system being accessed would be responsive to such codes as are applied to the telephone line 2 and, under these conditions, the application of an enabling signal on the conductor 46 would additionally be required to initiate a breaking of the connection of the user's handset with the telephone line for the dialing interval to permit the generation of both on-hook and off-hook signals. The auto dialer means 17 must also operate in the same mode as the handset and hence handset signals could be converted or the auto dialer 17 could operate to generate dial pulses. Conversion would be necessary where the leased line system could not respond to rotary dial pulses.

Upon an actuation of the automatic dialer means 17, a triggering signal is also applied through conductor 52 to one shots 54. The one shot 54 may take the conventional form of a monostable multivibrator described above except that the same would here have a duty cycle of from six to ten seconds. The output of the one shot 54 is connected through conductor 55 to enable input of a tone detector 56. The tone detector may take any conventional form of tone detector capable of detecting tones of the type with which the computer responds when the same answers the telephone line in response to the seven digit access code. Under most circumstances, this tone corresponds to a dial tone and hence the tone detector 56 would take a similar form to the dial tone detector 13. The tone detector 56 is also connected through conductors 57, 51 and 3 to the telephone line in order that the same may detect, when enabled by a high on conductor 55, the tone placed on the line by the answering computer by way of handshaking. Upon detection of such tone, an enabled tone detector 56 will place a high at the output thereof on conductor 59. Upon the application of a high on the conductor 59, the code dialer means 18 is enabled whereupon the five digit code corresponding to a subscriber's billing code is generated and applied to the telephone line through conductors 60, 51 and 3. Thus, it will be seen that the embodiment of the invention illustrated in FIG. 1, once a user at one of the handsets 1A, 1B–1N picks up the receiver, acquires dial tone and generates the three exchange digits for the private line long distance subscriber service and, thereafter, stops dialing the automatic dialing system according to the instant invention as illustrated in FIG. 1, acts to generate the remaining four digits of the access telephone number, awaits receipt of dial tone and, thereafter, generates the five digits of the subscriber's billing code. However, if either an improper combination of the first three digits are generated at a handset or the proper first three digits are generated and followed by further digits, the automatic calling system embodied in FIG. 1 will not be actuated. Furthermore, it should be noted that, while the embodiment of the invention illustrated in FIG. 1 employs a one shot 54 to define an interval during which a responding tone may be detected by the tone detector 56 and uses the tone detector 56 as well, both circuits may be deleted in favor of a seven second delay device which is enabled by the automatic dialing means 17 and which, in turn, would effect the code dialer means 18. This position is taken since, once the access number is automatically dialed, it may be assumed that the computer will answer in the requisite interval and the billing code information automatically applied to the telephone line 2 thereafter. Thus, since the user is listening to what is occurring on the telephone line 2 and, should the computer come back with a busy signal or the like, it may safely be assumed that the user will hang up the handset or, alternatively, should the computer otherwise fail to answer, the issuance of the billing code by the code dialer means 18 will fail to produce recognizable results on the telephone line which the user is monitoring.

In operation of the embodiment of the invention illustrated in FIG. 1, it will be appreciated that, when a user lifts one of the handsets 1A–1N and dial tone is acquired, the same will be applied from the telephone line 2 through conductors 3 and 25 to the dial tone detector means 13. When dial tone is thus detected, a high level will be applied from the output thereof through conductor 24 to the delay means 23. This places a high on the input of the AND gate 9 for the duration of the delay cycle thereof after dial tone has terminated. When the operator hears that dial tone has been acquired, the three digits associated with the exchange code for the computer controlling the long distance leased lines subscriber system will be entered at the DTMF pad of the handset in appropriate sequence. Each of these digits are applied in sequence through conductor 3 to the first, second and third digit decoder means 4–6 as well as to the central exchange station through the telephone line 2. The first digit received, assuming the same is appropriate, will be decoded by the first digit decoder means 4 so that a high is applied to the second input of AND gate 9 through conductor 19. As the AND gate 9 has already been conditioned by a high from the delay means 23 subsequent to an acquisition of dial tone, it will produce a high at the output thereof on conductor 26 to trigger one shot 28 and precondition AND gate 10 through the conductor 29.

Similarly, the entry of the second appropriate digit at the DTMF pad will cause the output of the second digit decoder means 5 to go high and this high is applied through conductor 20 to the already enabled AND gate 1 whereupon a high is applied through conductor 30 to the one shot 32. This results in an enabling of AND gate 11 through conductor 34. Thus, when the third digit of the requisite sequence is applied to the telephone line 3, it will be decided by the third digit decoder 6 to apply a high on conductor 21 whereupon the output of the AND gate 11 on conductor 35 will go high. Of course, should dial tone not be acquired or the three exchange digits improperly generated, no high will occur at the output of AND gate 11; however, as all of these digit tones have been applied through the telephone line 2 to the central station, the handset will act in the usual manner as if the embodiment of the invention illustrated in FIG. 1 is not attached thereto.

When the output of AND gate 11 goes high, this high is applied directly to the delaying means 37 as well as the one shot 41. Since the output of the delay means 37 stays low for approximately the one and one-half second delay interval exhibited thereby, the signal level on conductor 34 will remain low whereupon a high is applied to the input to NOR gate 39 connected to conductor 45. However, the high level output of AND gate 11 serves to trigger the one shot 41 whereupon a high level is applied to the output thereof connected to conductor 48 to enable the AND gate 43. If, during the one and one-half second cycle of the one shot 41, another digit code is applied to the telephone line 2 from the user's handset, this signal will be applied through conductor 49 to the second input of AND gate 43. Upon an occurrence of this event, the output of the enabled AND gate 43 will go high to trigger the four second one shot 42 whereupon a high level will be applied to the input of NOR gate 39 for the four second duty cycle thereof. Under these conditions, after an expiration of the one and one-half second delay exhibited by the delay means 37, when the input to NOR gate 39 on conductor 45 goes low, the output of the NOR gate 39 will remain low. However, if during the one and one-half second interval associated with one shot 41 no additional tone code is applied to the telephone line, the output of AND gate 43 will never go high and, accordingly, one shot 42 will not be triggered. Under these conditions, the input to NOR gate 49 remains low and hence, upon the expiration of the one and one-half second delay exhibited by delay means 37, when the output of the inverter 38 goes low both inputs to NOR gate 39 will be low. Upon the occurrence of this event, the output of NOR gate connected to conductor 46 will go high to trigger the automatic dialing means 17.

Upon a triggering of the automatic dialing means 17, the four remaining digits of the access telephone code will be generated and applied through conductors 51 and 3 to the telephone line to the central station whereupon the complete access telephone number for the subscriber system will have been dialed. At the same time, the one shot 54 is triggered to enable the tone detector means 56 through conductor 55. If subsequently, under these conditions, the answering computer applies a handshaking tone to the telephone line 2, this tone will be detected through conductors 3, 51 and 57 by the tone detector means and a high will be supplied thereby on conductor 59 to trigger the code dialer means 18. This causes the billing code associated with the subscriber to be tone generated and applied through conductors 60, 50, 1 and 3 to the telephone line 2. Upon the operator hearing a silence on the line, the long distance number to be dialed through the subscriber equipment may then be generated by the handset. Additionally, as will be appreciated by those of ordinary skill in the art, the code dialer means 18 may additionally generate a beep code upon receipt of the last digit of the billing code sequence so that the operator is audibly advised to enter the area code and phone number at the location desired to be contacted through the private long distance leased line system.

Accordingly, it will be appreciated that the embodiment of the invention illustrated in FIG. 1 allows each of the handsets 1A–1N to be employed in a normal manner except when it is desired to place a telephone call through a private long distance leased line system. Under these conditions, the exchange digits of the system are dialed and, assuming no additional digits for the central exchange are dialed by the operator indicating that a normal call to the area is desired, the automatic calling system according to the instant invention will generate the remaining digits of the telephone number and apply the same to the telephone line 2. Thereafter, these will be followed by the subscriber's billing code information and the operator is subsequently advised that the area code and the local number of the location to be contacted through the private line system may be entered.

Figure 2:
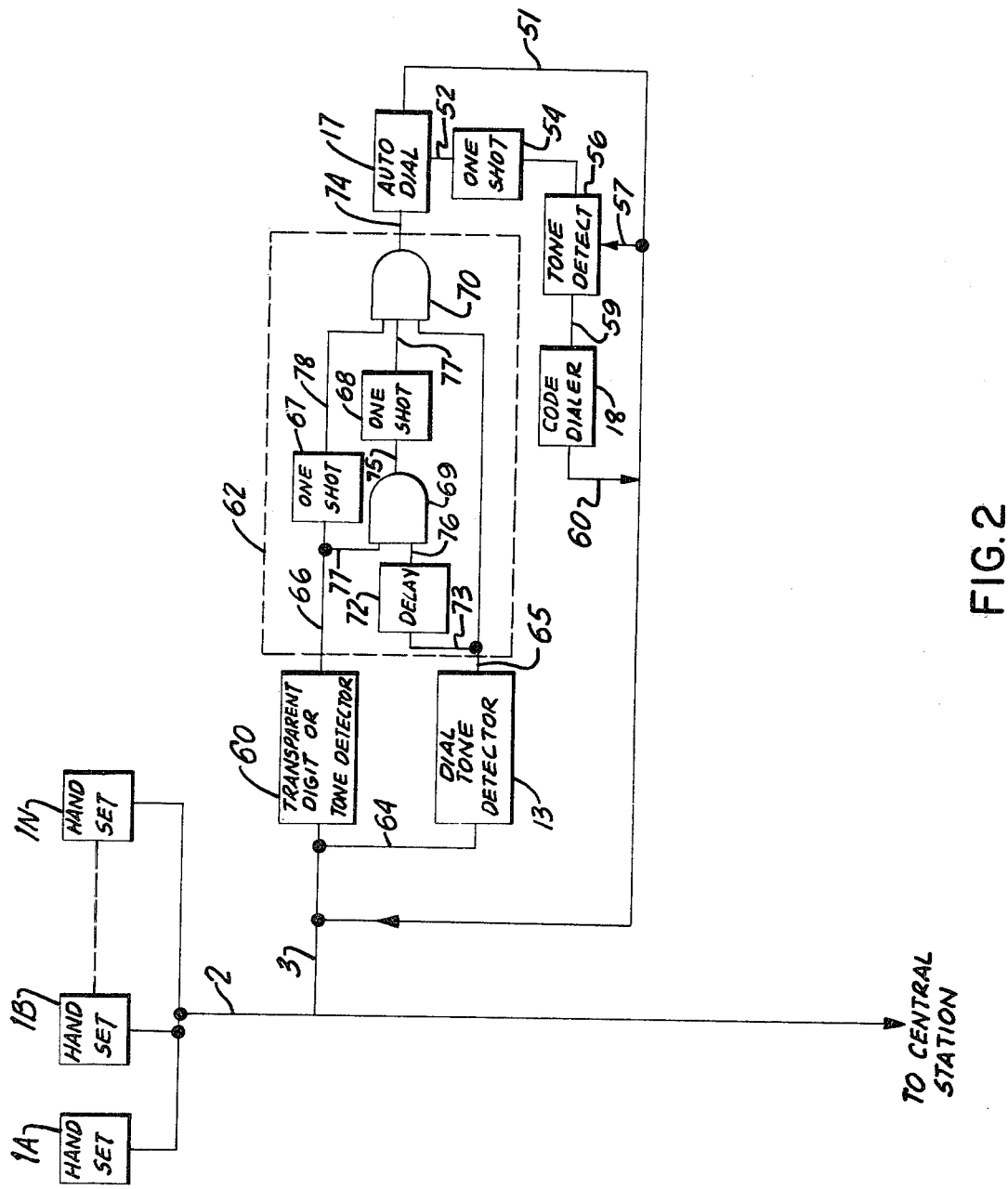
FIG. 2 is a block diagram serving to schematically illustrate another embodiment of the automatic calling system according to the present invention wherein a code which is transparent to (i.e. not recognized by) the local telephone system serves to enable an automatic dialing operation.

Referring now to FIG. 2, there is shown a block diagram serving to schematically illustrate another embodiment of the automatic calling system according to the present invention wherein a code which is transparent to the local telephone system serves to enable an automatic dialing operation. More particularly, in the embodiment of the invention illustrated in FIG. 2, the automatic calling system according to the instant invention is actuated by the entry of a code at the handset to which the local telephone system will not respond and, upon a detection of such code, the automatic calling system according to the instant invention acts to automatically dial all seven digits required for contacting a computer controlling the subscriber's service or the like and, upon a contacting of the computer, the automatic calling system according to the instant invention further acts to automatically dial the five digit code associated with the subscriber's billing information. Thus, in the embodiment of the invention illustrated in FIG. 2, a user of the system need only enter one access code, await processing by the automatic calling system according to the instant invention and, thereafter, dial the area code and the destination phone number of the location with which communication is desired over the leased line subscriber service.

In most locations throughout the United States, to wit, those locations wherein a long distance telephone call may be placed without the initial entrance of a one code prior to the area code to switch the system to long distance lines, the one digit when entered just after the acquisition of dial tone is transparent to the telephone system and results in no loss of dial tone. In such locations, the embodiment of the invention illustrated in FIG. 2 may be employed to cause automatic dialing of all digits required for contacting the controlling computer over the local telephone system and identifying the subscriber through billing code information. Furthermore, the handsets to which the embodiment of the invention illustrated in FIG. 2 are connected may take the form of either rotary dial type or DTMF pad devices and, in each case, the automatic calling system may be employed to generate all DTMF codes for the system so that, effectively, long distance subscriber service may be acquired even when such subscriber system requires entry by DTMF devices without an updating of the subscriber's equipment. If, however, final destination telephone information must also be entered by DTMF codes, conversion is necessary.

As the embodiment of the invention illustrated in FIG. 2 is disclosed within a similar environment to that employed in connection with the disclosure of the embodiment illustrated in FIG. 1 and in many cases employs similar structure, structure which is illustrated in FIG. 2 which is the same as that already described in connection with FIG. 1 has been annotated with corresponding reference numerals to those employed in connection with such corresponding structure in FIG. 1 and will not be provided with a detailed structural description as such structure has already been described above. Accordingly, it will be appreciated by those of ordinary skill in the art that wherever corresponding reference numerals appear in FIG. 2 or, for that matter in succeeding figures hereof, such structure takes the same form as that already described in connection with FIG. 1 above and hence the structural definition thereof relied upon in connection with FIG. 1 should be viewed as also pertaining to these further embodiments of the invention.

The embodiment of the automatic calling system illustrated in FIG. 2 comprises a dial tone detector means 13, transparent digit detector means 60, sequence detector means 62 and auto dialers 17 and 18. The automatic calling system according to the instant invention, as illustrated in FIG. 2, is connected to subscriber's telephone equipment which, again, takes the form of a plurality of DTMF pad handsets 1A–1N which are connected in the manner indicated to a central station through a conventional telephone line 2. The automatic calling system is connected through a conductor 3 to the telephone line 2 where the same acts to receive information placed on the telephone line 2 or, when otherwise actuated, acts to impose DTMF information onto the telephone line 2.

The dial tone detector 13 may take the form of a conventional dial tone detector as was described in connection with FIG. 1 and is connected to the conductor 3 through a conductor 64 and to the sequence detector means 62 through a conductor 65. Similarly, the transparent digit or tone detector means 60 may take any of the conventional forms of this common device such as was employed for first, second or third digit decoder means 4–6 illustrated in FIG. 1. Here, however, the transparent digit or tone detector means 60 acts to detect the presence of the tone associated with a depression of the one button at any of handsets 1A–1N when the same is applied to the telephone line 2. The transparent digit or tone detector means 60 is also connected to the sequence detector means 62 through the conductor 66 and acts in the same manner as the dial tone detector means 13 to place a high at the output thereof connected to the sequence detector means 62 whenever the entry of a sum tone corresponding to the depression of the one button is ascertained.

The sequence detector means 62 comprises first and second one shots 67 and 68, first and second AND gates 69 and 70 and a delay means 72. As will be appreciated by those of ordinary skill in the art, the requisite sequence of events for actuating the automatic calling system illustrated in FIG. 2 is that a user will lift a handset 1A–1N, acquire dial tone, depress the one key at the DTMF pad and, since this input is not recognized by the system, the dial tone will be reinstated on the telephone line. Accordingly, the function of the sequence detector means 62 is to detect the presence of these events in appropriate sequence, i.e., acquisition of dial tone, the presence of a one tone, and the reacquisition of dial tone.

The output of the dial tone detector means 13 is connected, as aforesaid, through conductor 65 to the sequence detector means 62 and, more particularly, is connected through conductor 65 to one input of the AND gate 70 and through conductor 73 to the input of delay means 72. The AND gate 70 acts as the final stage of the sequence detector means 62 and takes the form of a conventional three input AND gate which acts, in the well known manner, to produce a high at the output thereof on conductor 74 only when all of the inputs thereto are high. The output of the dial tone detector means 13 supplied directly to the lowest input of AND gate 70 acts, in a manner which will be seen below, to define the third input condition on this gate that dial tone has been reacquired subsequent to a detection of the entry of the sum of the tones associated with the one digit.

The output of the dial tone detector means 13 which is supplied through conductor 73 to the input of the delay means 72 defines the initial condition associated with the operator's acquisition of dial tone and further acts in conjunction with AND gate 69 to insure that, while an allowable interval, associated with operator hesitance, may expire between when dial tone is initially acquired and the initial depression of a button at the DTMF pad of a handset, the first button depressed is, effectively, the one button which is detected by the transparent digit or tone detector means 60. More particularly, the delay means 72 may take any conventional form of delay device which inserts a delay of approximately one-half of a second to any input supplied thereto on conductor 73. Thus, whenever dial tone is detected by the dial tone detector means 13 and the input to the delay means 72 goes high, its output will go high one-half second thereafter and will stay high for one-half second after such dial tone has terminated.

The output of the delay means 72 is connected to one input of the AND gate 69. The AND gate 69 may take the conventional form of a two input AND gate which acts in the well known manner to produce a high at the output thereof connected to conductor 75 only when both of the inputs thereto are high. The lower input to AND gate 69 on conductor 76 is connected to the output of the delay means 72 while the second input to AND gate 69 is connected through conductor 77 and conductor 66 to the output of the transparent digit or tone detector 60. As the transparent digit or tone detector means 60 will produce a high at the output on conductor 66 only when a one digit has been entered at the handset, it will be appreciated by those of ordinary skill in the art that the input conditions to AND gate 69 will only be satisfied if an operator lifts the handset to acquire dial tone and, after dial tone has been acquired, depresses the one key at the DTMF pad. Should a one key be depressed after the depression of another button, dial tone will have been lost for more than one-half second and hence the succeeding depression of the one key, even though the same will produce a high at the output of the transparent digit detector means 60, will not serve meet both input conditions for the AND gate 69.

The output of AND gate 69 will go high, as aforesaid, only if the one button has been depressed at the DTMF pad as the first subsequent to the acquisition of dial tone. The output of the AND gate 69 is connected through conductor 75 to the input of the one shot 68. The one shot 68 may take any of the well known forms of monostable multivibrator devices which here has a duty cycle which corresponds to one-half second. The output of the one shot 68 is connected through conductor 77 to a second input of the AND gate 70. The function of the one shot 68 is to hold the condition defined by AND gate 69, i.e., acquisition of dial tone followed by the entry of a one code for a sufficient interval for the remaining two input conditions on AND gate 70 to be satisfied.

The output of the transparent digit or tone detector means 60 is applied directly through conductor 66 to the input of one shot 67. The one shot 67 may take precisely the same form as the one shot 68 and also exhibits a duty cycle of approximately one-half second. The output of the one shot 67 is supplied through conductor 78 to a second input of AND gate 78 and acts to define a condition corresponding to a detection of the one code by the transparent digit detector 60 and to hold such condition until dial tone is again acquired. Thus, the input to AND gate 70 on conductor 77 goes high after dial tone has been acquired and the transparent digit has been detected while the input to AND gate 70 on conductor 78 goes high upon a detection of the one code by the transparent digit or tone detector 60. However, it will be appreciated by those of ordinary skill in the art that, if some other digit beside a one code is entered after the handset has been lifted and a one code is subsequently entered, the input to AND gate 78 will go high upon the detection of such one code. However, since the input conditions on AND gate 69 were never satisfied, the input to AND gate 70 on conductor 77 will not go high. The lower input to AND gate 70 on conductor 65, as aforesaid, is connected directly to the output of the dial tone detector means 13 and hence the same goes high when dial tone is initially acquired and also when dial tone is reacquired upon a release of the one key. When dial tone is initially acquired, the inputs to AND gate 70 on conductors 77 and 78 will still be low so that the output of the AND gate 70 will remain low; however, if dial tone had been initially acquired and the one button depressed prior to the depression of any other button at the DTMF pad, upon a release of this button, all three input conditions to AND gate 70 will be satisfied whereupon the output thereof on conductor 74 will go high.

Whenever a high is present at the output of AND gate 70 as applied to conductor 74, it will trigger the auto dialer 17 in the same manner described in connection with FIG. 1 except that, in the embodiment of the invention illustrated in FIG. 2, all seven digits of the local telephone number required to be dialed to access the computer will be dialed and applied through conductor 51, in the same manner as described in connection with FIG. 1, to the telephone line 2. The activation of the auto dialer 17 will also enable the one shot 54 in the same manner described in connection with FIG. 1. Furthermore, the one shot 54, the tone detector 56 and the code dialer means 18 each take the same form, and cooperate in the same manner as described in connection with FIG. 1 to await an answer of the telephone line by the computer and a detection of an answering tone or a succeeding generation of the subscriber's five digit billing code or the like.

In operation of the embodiment of the invention illustrated in FIG. 2, a user will lift a handset and acquire dial tone in the normal manner. When dial tone appears on the telephone line 2, the same will be applied to the dial tone detector 13 through conductors 2 and 64 whereupon a high will be produced by the dial tone detector on the output thereof connected to conductor 65. This high will be applied to the input of AND gate 70 and to the delay means 72. The output of the AND gate 70 will remain low since none of the inputs thereto on conductor 77 or 78 are high under the conditions here being described. Upon the expiration of the one-half second delay associated with the delay means 72, the output of the delay means 72 will go high on conductor 76 to apply a first high to the AND gate 69. Thus, this condition will persist at the output of the delay means 72 until the user depresses a button at the DTMF pad associated with the actuated handsets 1A-1N. When the user gets around to depressing a key at the DTMF pad, the dial tone detect output at the delay means 72 will persist for approximately one-half second. If the user has depressed the one key, this condition will be detected by the transparent digit or tone detector means 60 and a high will appear at the output thereof on conductor 66. This will place a second high on the input to the AND gate 69 and directly trigger the one shot 67. Thus, under these conditions, both the one shot 67 and the one shot 68 are triggered to produce a high at the outputs thereof connected to conductors 77 and 78 for the half-second duty cycles associated therewith. When the one button is released, dial tone will be reacquired on the telephone line as the depression of the one button has no effect at the central station. Under these conditions, the output of the dial tone detector means 13 will again go high whereupon all three inputs to the AND gate 70 will be high to produce a high at the output thereof connected to conductor 74.

Should, however, an operator depress a digit other than a one, the output of the transparent digit or tone detector means 60 will not go high on conductor 66 within the half-second delay interval associated with the delay means 72. This means the input conditions on AND gate 69 will not be satisfied so that the one shot 68 will not be triggered to produce an enabling level on conductor 77. Thus, under these circumstances, even if a one is present in the sequence of numbers being dialed by the operator, a high condition at the output of the transparent digit or tone detector means 60 will not occur until after the output of the delay means 72 has gone low so that, while a high at the output of the transparent digit or tone detector means 60 may trigger may trigger the one shot 67, the one shot 68 will not be triggered. Thus, even if the operator subsequently, temporarily hangs up such as by using a recall key or the like and quickly obtains dial tone again, all three input conditions of AND gate 70 will not go high under any circumstances. Thus, it is only when dial tone is initially acquired, the one button is depressed and released in a normal manner does the output of AND gate 70 go high.

When the output of AND gate 70 produces a high on the conductor 74, the auto dialer means 17 is triggered to cause, as aforesaid, the contents of a read only memory to be sequentially applied to a tone generator or the like so that the seven digit number associated with the subscriber system is automatically generated by the auto dialer means 17 and applied through conductor 51 to the telephone line 2. The actuation of the auto dialer means 17 will also cause the triggering of the one shot 54 to supply an enabling level to the tone detector 56. Thereafter, when the computer answers and applies a dial tone or other handshaking tone to the telephone line 2 and the same is applied through conductor 57 to the tone detector 56, a high will be produced on the conductor 56 to trigger the code dialer means 18. This will cause, as aforesaid, the five digit code to be read sequentially from a read only memory or the like and applied to a tone generator so that the five digit code associated with the subscriber's billing number is generated and applied through conductors 60, 51 and 3 to the telephone line 2. As aforesaid, a beep tone may be employed as a sixth code inserted on the line by the code dialer means 18 which acts as an advisory to the user to dial the area code and local phone number of the destination to which it is desired to complete the call.

Thus, it will be seen in the embodiment of the invention illustrated in FIG. 2, a transparent digit is employed to actuate the embodiment of the automatic calling system illustrated in FIG. 2 and the automatic calling system thus initiated acts to dial both the local phone number to access the computer controlled private line system and to, thereafter, automatically dial the billing code associated with the subscriber. As was described above, the use of the one tone is only operable in portions of the country where the same is not employed by the telephone company to switch in long distance lines prior to the area code on a long distance call to be completed. Should it be desired to employ the embodiment of the invention illustrated in FIG. 2 in areas where the one digit on a rotary dial or DTMF pad is not transparent to the telephone system, other forms of transparent actuating codes may be employed. Thus, for instance, a portable tone generater of the type utilized to actuate playback of a remote telephone recording system may be held up to the receiver and employed to actuate the automatic dialing system or, alternatively, where the subscriber is using DTMF pad telephones, the DTMF pad may be employed to generate codes which are transparent to the system. For instance, as will be readily appreciated by those of ordinary skill in the art, each time a key or button on a DTMF pad is depressed, the row and column frequencies associated with its matrix location are generated in the manner described above and the telephone system is specially configured to respond only to the sum frequencies associated with each of the various combinations. Therefore, any actuation of the DTMF pad which results in the generation of sum frequencies not associated with the various row and column combinations will affect a generation of tones which are transparent to the telephone system. Thus, for instance, the simultaneous depression of two buttons at once on the DTMF pad will result in a combination of frequencies which are not recognizable to the telephone system and hence may be treated as transparent and used to actuate an embodiment of the automatic calling system according to the instant invention. Furthermore, as will be appreciated by those of ordinary skill in the art, various combinations of pairs of buttons on a DTMF pad may be employed to generate different ones of transparent frequencies which may be utilized to define more than one phone number to be automatically dialed by the automatic calling system according to the instant invention and a decoding thereof may be provided by a plurality of transparent digit or tone detectors 60 each of which is devoted to the detection of a different pair of tones. It will be appreciated that whenever a single tone rather than a sum is employed for actuation of the system, tone detection is rendered markedly less complex.

Figure 3:
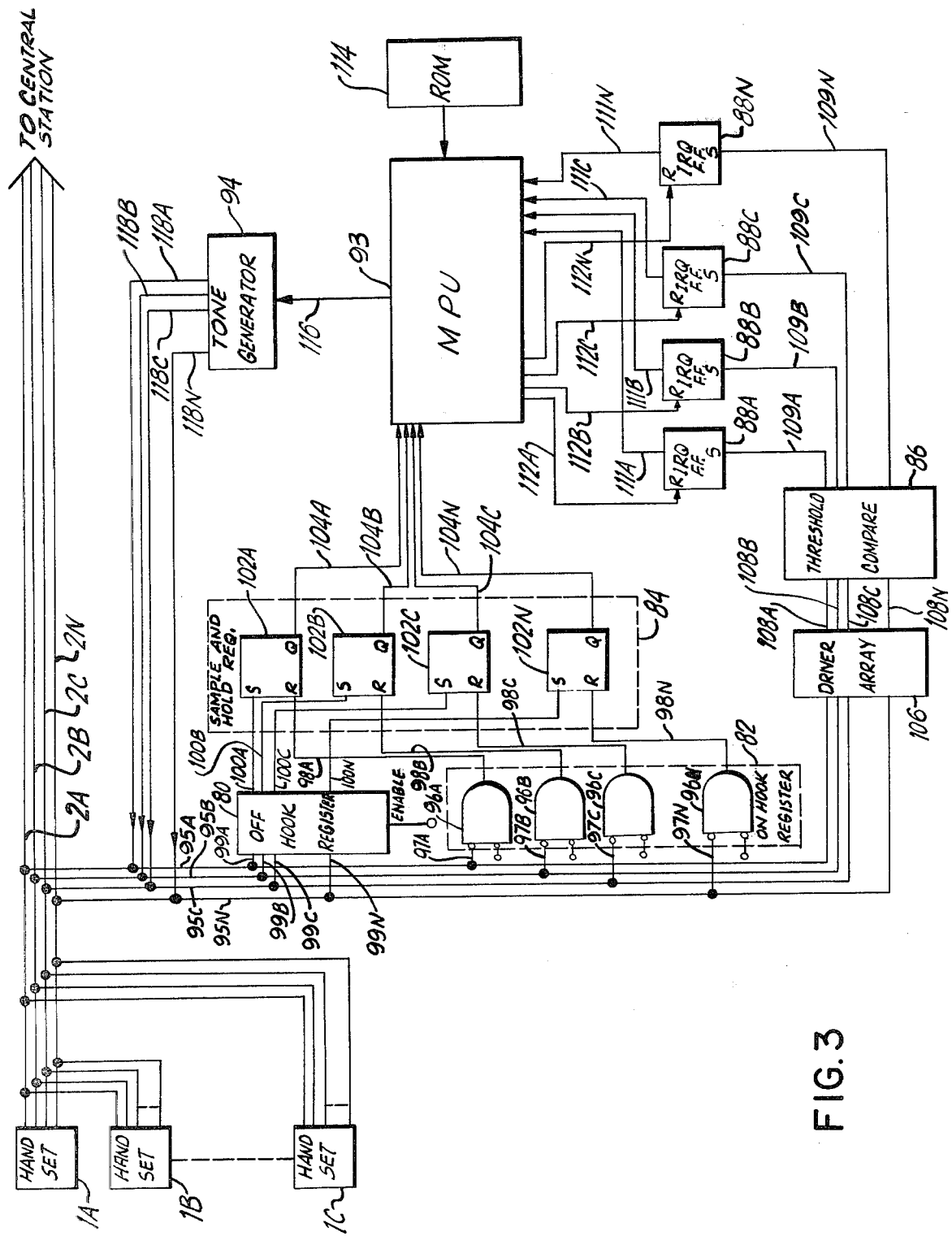
FIG. 3 is a block diagram serving to schematically illustrate a microprocessor controlled embodiment of the automatic calling system according to the present invention.

Referring now to FIG. 3, there is shown a block diagram which serves to schematically illustrate a microprocessor controlled embodiment of the automatic calling system according to the present invention wherein service is provided for both a plurality of handsets each of which has an access to a plurality of lines or extensions. The embodiment of the automatic calling system illustrated in FIG. 3 comprises off-hook register means 80, on-hook register means 82, sample and hold register means 84, threshhold comparison means 86, interrupt request flip-flops 88A–88N, microprocessor means 93 and tone generator means 94. The automatic calling system according to the instant invention, as illustrated in FIG. 3, is connected to subscriber's telephone equipment which here takes the form of a plurality of DTMF pad handsets 1A–1N, as aforesaid, although, as will be readily appreciated by those of ordinary skill in the art, a similar embodiment could be implemented employing rotary dial equipment. Each of the subscriber handsets 1A–1N are connected in the manner indicated to a plurality of selectable extensions connecting to a plurality of telephone lines 2A–2N each of which, in turn, is connected to the central station. While the number of extensions and telephone lines 2A–2N have been generally indicated, as serviced by the single embodiment of the automatic calling system illustrated in FIG. 3, it will be appreciated that the number of lines which may be actually serviced will be a function of the sampling rate and processing speed of the microprocessor means 93. However, conventional processing equipment is capable of serving up to eight telephone lines without taxing the system. Hence, the embodiment of the invention illustrated in FIG. 3 is highly versatile and quite practical for many configurations of subscriber's equipments since frequently no more than eight lines are required for such subscribers and, even under circumstances where more than eight lines are employed, it would be sufficient to provide only eight of the total number of lines utilized with long distance capability associated with a private subscriber service.

The automatic calling system illustrated in FIG. 3 is connected in parallel with each of the telephone lines 2A–2N through conductors 95A–95N and includes a first circuit portion including the off-hook register means 80, the on-hook register means 82 and the sample and hold register means 84 which act to enable the microprocessor means 93 to monitor the on-hook or off-hook condition associated with a particular telephone line 2A–2N. In addition, the automatic calling system illustrated in FIG. 3 includes a second circuit portion associated with the threshhold compare means 86 and the interrupt request flip-flop means 88A–88N which allow the microprocessor means 93 to ascertain whether or not the automatic calling system is to be actuated and a third circuit portion associated with the tone generator means 94 for automatically generating, under program control, the seven digit telephone numbers necessary for contacting the subscriber service and, thereafter, the five digit code number required for identifying an individual subscriber.

Both the off-hook and on-hook register means 80 and 82 are connected to respective ones of the conductors 95A–95N and each register means includes a discrete gate means therein for responding to a condition of the telephone lines associated therewith. Thus, as indicated within the dashed block 82 employed to depict the on-hook register means 82, AND gates 96A–96N are connected to each of the conductors 95A–95N and serve to monitor the condition of the telephone lines 2A–2N associated therewith. In the case of the on-hook register means 82, AND gates whose inputs are inverted are employed in such manner that a first input thereto, as connected on conductors 97A–97N, are connected to respective ones of the conductors 95A–95N, while the second input to the AND gates 95A–95N are connected (not shown) to the sample and hold register means 84 and, more particularly, to the complimentary output ($\overline{Q}$) of each of the sample and hold flip-flops, employed therein, for the respective ones of the telephone lines 2A–2N which are monitored. The AND gates 96A–96N whose inputs are inverted may take any of the well known forms of this conventional class of device and act in the well known manner to produce a high at the outputs thereof connected to conductors 98A–98N only when both of the inputs thereto are low. As shall be apparent hereinafter, the output of each of the AND gates 96A–96N goes high whenever an on-hook condition occurs on the telephone line which is being monitored thereby and this high level output on conductors 98A–98N is employed to reset the respective flip-flops within the sample and hold register 84 employed to monitor the on-hook or off-hook condition of respective ones of the telephone lines 2A–2N. The off-hook register means 80, though generally illustrated in block form in FIG. 3, may take the same form as the on-hook register means 82 except that AND gates not having inverted inputs are employed and one such AND gate is associated with each of the conductors 95A–95N. Accordingly, each of the AND gates within the off-hook register means 80 is connected through one of the conductors 99A–99N so as to monitor the condition on an associated one of the telephone lines 2A–2N. A second input to each of the AND gates within the off-hook register means 80, while not shown in FIG. 3, is connected to the Q output of an associated one of the sample and hold flip-flops within the sample and hold register means 84. Each of the AND gates within the off-hook register means 80 may take any of the well known forms of this conventional class of device and acts to produce a high at the output thereof as indicated on conductors 100A–100N only when both of the inputs thereto are high. Thus, as will be appreciated by those of ordinary skill in the art, whenever an off-hook condition obtains on telephone line 2A, a high level output will be produced at the output of the off-hook register means 80 on conductor 100A, while when an on-hook condition occurs on the telephone line 2A, a high level output will be produced at the output of the on-hook register means 82 on conductor 98A and corresponding conditions will occur for each of the remaining telephone lines 2B–2N being monitored as reflected on the output conductors 100B–100N and 98B–98N at the outputs of the off-hook and on-hook register means 80 and 82.

The sample and hold register means 84 may take the form, as shown within the dashed block, of individual flip-flops 102A–102N associated with each of the telephone lines 2A–2N. Each of the flip-flops 102A–102B is set in response to the occurrence of an off-hook condition on a respective one of the outputs 100A–100N of the off-hook register means 80 and is reset in response to a reoccurrence of a high level at a respective one of the outputs of the on-hook register means 82 as the same appear on conductors 98A–98N. Thus, each of the outputs of the off-hook register means 80 is connected as indicated by the conductors 100A–100N to the set input of a respective one of the sample and hold flip-flops 102A–102N and, in a corresponding manner, respective ones of the outputs of the on-hook register means 82, as present on conductors 98A–98N, are connected to the reset inputs of an associated one of the sample and hold flip-flops 102A–102N. Thus, each of the sample and hold flip-flops 102A–102N is placed in the set state to produce a high at the output thereof whenever an off-hook condition is reflected on the telephone line 2A–2N being monitored thereby and is reset to produce a low at the Q output thereof whenever the telephone line being monitored thereby is placed in an on-hook condition. Although not shown in FIG. 3, the complimentary or $\overline{Q}$ output of each of the flip-flops 102A–102N is employed to provide enable inputs for the individual AND gates within the off-hook register means 80 and, conversely, the Q output of each of the sample and hold flip-flops 102A–102N is employed to provide an enable input for associated ones of the AND gates 96A–96N within the on-hook register means 82. The Q outputs of each of the sample and hold flip-flops 102A–102N are applied through conductors 104A–104N to respective inputs of the microprocessor means 93 and, as will readily be appreciated by those of ordinary skill in the art, whenever a high level is present on one or more of these conductors 104A–104N, the telephone line associated therewith is in an off-hook condition, while whenever these conductors 104A–104N have a low level thereon, the associated telephone line being monitored thereby is in an on-hook condition. Thus, through the inputs supplied on conductors 104A–104N, the microprocessor means 93 is constantly in a condition to monitor the on-hook or off-hook condition of the telephone lines 2A–2N.

The conductors 95A–95N are also connected to the threshhold comparison means 86 through a driver array 106. The driver array 106 may comprise a conventional driver array which includes at least one amplifier stage for each of the inputs thereto on conductors 95A–95N and acts in the well known manner to supply sufficient gain to each input so that signals on these input lines may be further processed. The outputs of the driver array 106 are connected on the output conductors 108A–108N to the threshhold comparison means 86 wherein each output of the driver array 106 represents the amplified signal level on a respective ones of the telephone lines 2A–2N.

The threshhold comparison means 86 may comprise a plurality of conventional comparator or differential amplifier means which act in the well known manner to compare an input signal provided thereto on one of input conductors 108A–108N to a threshhold level and provide an output only if the signal applied thereto exceeds the threshhold level established. Thus, the threshhold comparison means 86 acts to compare any one of the signals on the telephone lines 2A–2N to a predetermined threshhold level and, if such signal exceeds the predetermined threshhold, to provide a resultant signal at the outputs thereto connected to conductors 109A–109N. The threshhold comparison means 86 thereby acts to suppress any noise on the telephone lines being monitored so that only input signals whose amplitude exceeds the predetermined threshhold established thereby are further conveyed to the interrupt request flip-flops 88A–88N.

The interrupt request flip-flops 88A–88N may take the form of conventional flip-flop devices which are placed in a set state each time an input is supplied to the set input thereof and are reset each time an input level is supplied to the reset input thereof. The function of the interrupt request flip-flops 88A–88N is to generate a pulse each time the signal on one of the telephone lines 2A–2N exceeds a predetermined level so that the outputs generated by the interrupt request flip-flops can be employed by the microprocessor means 93 as interrupts which are counted for predetermined intervals and hence employed to detect the frequency of information received through a zero crossing tone detection scheme.

Alternatively, the time between interrupts may be employed for purposes of detecting and determining frequency. The outputs of the threshhold comparison means 86 are connected through conductors 109A–109N to the set inputs (S) of the interrupt request flip-flops 88A–88N and the outputs of each of the interrupt request flip-flops are connected through conductors 111A–111N to the inputs of the microprocessor means 93. The reset inputs (R) to each of the interrupt request flip-flops 88A–88N are connected through conductors 112A–112N to the outputs of the microprocessor means 93. As will be appreciated by those of ordinary skill in the art familiar with zero crossing tone detection techniques, each time a tone is present on one of the telephone lines 2A–2N an output will be generated by the threshhold comparison means 86 each time the amplitude of the analog signal exceeds the threshhold level established thereby and, each time the threshhold comparison means 86 generates an output signal, that output signal places the associate one of the interrupt request flip-flops 88A–88N in a set condition. When one of the interrupt request flip-flops 88A–88N is placed in a set condition, a high level will occur at the output thereof connected to the microprocessor through one of the conductors 111A–111N. This pulse is then taken by the microprocessor 93 for the purposes of counting within a predetermined interval to obtain an indication of the frequency thereof and, after each pulse is taken by the microprocessor means 93, the interrupt request flip-flop 88A–88N which provided the interrupt is reset by the microprocessor means 93 on one of lines 112A–112N. In this manner, the microprocessor means 93 may quickly ascertain the frequency of any signal occuring on one of the telephone lines 2A–2N to ascertain whether or not the automatic calling system is to be actuated and, if the proper frequency for the tone present on one of the telephone lines 2A–2N is ascertained, automatic dialing may be initiated under program control.

The microprocessor means 93 may take any of the well known forms of this conventional class of device having appropriate requirements for the instant application. For instance, a Motorola Model 6802 microprocessor chip having one hundred and twenty-eight bytes of RAM was employed in test versions of the instant automatic calling system which were built and tested. A similar configuration for the microprocessor means 93 such an the Intel 8080 or 8088 series of processor could be used; however, lower cost versions of four byte processors are perfectly adequate for simplified versions of the embodiment of the invention illustrated in FIG. 3 and, thus, equipments such as the National Scamp Series could also be employed for embodiments of the invention wherein four lines are to be monitored and only a single, automatic dialing function is desired. Similar small scale processors could also be utilized where it was desirable to rely upon one processor per line controlled. The microprocessor means 93 is provided with a read only memory 114 which acts, in the conventional manner, to provide the hard wired program therefor. The read only memory 114 may comprise a conventional read only memory, PROM, EPROM or, alternatively, a bootstrapped RAM may be utilized. For purposes of an experimental version of the instant invention which was built and tested, an Intel Model 2716 read only memory (2K×8) was employed for purposes of storing the executive routine as well as the operational routines illustrated in FIGS. 4–7 and the telephone code information and the issuing sequences therefor under program control.

The output of the microprocessor means 93 is connected through cable 116 to tone generator means 94. The tone generator means 94 may take any of the conventional forms of this well known class of device which acts, in response to a digital code applied thereto by the microprocessor 93 on cable 116, to generate a tone corresponding to the sum frequencies of the given digit on the DTMS pad whose analog is issued under program control by the microprocessor 93. As each tone is generated by the tone generator means 94, it is issued through one of conductors 118A–118N and applied to the telephone line 2A–2N to implement service by the automatic calling system according to the instant invention.

In operation of the embodiment of the automatic calling system illustrated in FIG. 3, an operator would lift the handset 1A–1N to cause an off-hook condition and the subsequent acquisition of dial tone on the telephone line 2A–2N corresponding to the extension selected by the user at his handset. Subsequent to the lifting of the handset and the acquisition of dial tone, the user would enter a transparent code at the handset to cause the initiation of the automatic calling system illustrated in FIG. 3. Alternatively, should the user desire to make an ordinary call in the usual manner, the number would just be entered at the DTMF pad and the automatic calling system illustrated in FIG. 3 will not be actuated for reasons which will appear hereinafter.

Once the user has acquired dial tone and, assuming that the automatic calling system illustrated in FIG. 3 is to be employed to automatically dial a subscriber's service, the user will depress two keys at the DTMF pad for purposes of actuating the automatic calling system. For purposes of this description, it is assumed that the automatic calling system illustrated in FIG. 3 is simply utilized to automatically dial the seven digits associated with the computer location and subsequently to issue a five digit tone code corresponding to the subscriber's billing number. Under these circumstances, it may be further assumed that the user's instructions for actuating the system are to depress the one and two keys at the DTMF pad at his handset for the generation of the sum frequencies associated with DTMF codes A1, A2 and B1. It should be understood at the outset, however, that, for the simple, single number dialing mode here being discussed, any pair of buttons, such as the # and * buttons, yielding any one of the seven possible combinations of transparent tones from the DTMF pad at the handset could be employed for purposes of actuating the system or, alternatively, a one code could also be employed or a tone which is not associated with the handset per se could be utilized. Furthermore, in utilizng the simultaneous depression of two buttons at the DTMF pad, seven possible transparent tones, each of which is relatively easy to detect, can be generated and, additionally, more combinations are available if multiple depression of button pairs are employed. Thus, as shall become apparent to those of ordinary skill in the art, while a simple, single telephone number and billing code embodiment of the instant invention is illustrated in FIG. 3, in effect, each of the seven transparent pair codes could be employed to define a separate telephone number to the microprocessor illustrated in FIG. 3 mutually or in place of the billing code and cause the issuance of instructions therefor to cause the tone generator means 94 to implement an automatic dialing operation for one of seven telephone numbers or a first telephone number followed by several others once the computer is contacted could be automatically dialed. Furthermore, additional automatic dialing functions could also be implemented were pairs of transparent codes employed for this purpose. However, for purposes of the instant disclosure, the description of a single function automatic callings system is sufficient for an appreciation of the present invention.

Assuming that none of the telephone lines 2A–2N are being utilized, all of the outputs of the on-hook register 82 on conductors 98A–98N will be high to thus place each of the sample and hold flip-flops 102A–102N within the sample and hold register means 84 in a reset state. Under these conditions, all of the inputs to the microprocessor means 93 on conductors 104A–104N will be low. At this juncture, the microprocessor means 93 is in a monitor routine where it is periodically checking the status of each of the lines 104A–104N to ascertain any possible need for service. If it is now assumed that an operator at one of the handsets depresses an extension button so that access to telephone line 2A is acquired together with dial tone, a high level will occur on conductor 95A to cause the off-hook register means 80 to place a high level on conductor 100A. This will cause the sample and hold flip-flop 102A to be set to place a high on the output conductor 104A and indicate to the microprocessor means 93 that telephone line 2A is in an off-hook condition and may require service.

If the user at the actuated handset now depresses DTMF buttons one and two at the handset, a transparent code will be placed on the telephone line 2A which will not effect the marker at the central station as the central station is set up to only detect the principal sum frequencies associated with the depression of independent ones of the buttons at the DTMF pad. The analog signal thus generated on the telephone line 2A will also be conveyed through conductor 95A to the input of the driver array means 106 where the same will be amplified and applied through conductor 108A to the threshhold comparison means 86. Since the threshhold level established by the threshhold comparison means 86 is sufficiently low to pass intentionally generated tone signals issued by a depression of a pair of buttons at the handset, the threshhold comparison means 86 will place a high at the output conductor 109A each time the analog signal applied thereto exceeds the threshhold set thereby. Thus, each time this threshhold level is exceeded, a high level will be applied to conductor 109A which causes the interrupt request flip-flop 88A to be placed in a set condition. This, in turn, will generate an interrupt request pulse on conductor 111A which will be processed on a priority basis by the microprocessor means 93 and, thereafter, the microprocessor means 93 will reset the interrupt request flip-flop 88A so the same is again in a condition to be set when the analog signal representing the transparent access tone again exceeds the threshhold of the threshhold comparison means 86. Thus, it will be appreciated by those of ordinary skill in the art that the microprocessor means 93 receives an interrupt request each time the analog signal associated with the tone applied to the telephone line 2A exceeds the predetermined threshhold of the threshhold comparison means 86.

The microprocessor means 93 acts to time each interrupt request supplied thereto by the interrupt request flip-flop 88A for a predetermined interval to ascertain whether or not the analog signal on the telephone line 2A is the predetermined actuation frequency therefor. The manner is which this is done will be described in greater detail in connection with the flow charts associated with FIGS. 4–7; however, it is here sufficient to appreciate that each interrupt generated is counted for a predetermined interval to obtain the frequency of the tones on the telephone line 2A. This is repetitively done and, if eight indications that the desired actuation tone is present are received prior to two indications that another tone is present, the microprocessor means 93 will first issue a tone from the tone generator means 94 on conductor 118A to advise the user that it has successfully contacted the automatic calling system and, thereafter, will issue tones on conductor 118A corresponding to the telephone number of the computer in control of the private line long distance system. Thereafter, upon receipt of a further instruction by the user or, alternatively, the expiration of a predetermined interval in which a ready tone should have been received from the computer location, the microprocessor means 93 will cause the tone generator to issue tone codes corresponding to the five digit billing information necessary to define the subscriber. Thereafter, another beep will be issued on the conductor 118A to advise the user that he may now dial the area code and local phone number for the location to which the telephone call is to be completed. Should the user hear a busy signal from the contacted computer site or otherwise decide to hang up a handset, an on-hook condition will be immediately recognized by the on-hook register means 82 at the sample and hold register means 84. This will cause a low level to be assumed on conductor 104A and hence next time the microprocessor samples the condition of this line in a monitoring sequence, the automatic calling sequence initiated will be aborted. Similarly, as shall be seen below, should the tones entered by the operator not correspond to the frequency to which the automatic calling system is configured to respond, the automatic calling system according to the instant invention will not be actuated and will remain transparent to the system issuing no tones to the telephone line which has been placed in an off-hook condition.

The actual processing of signals within the automatic callings system illustrated in FIG. 3 may best be appreciated upon a detailed review of the annotated program listing attached hereto as the Appendix; however, in order to provide a reader with an overall review of the processing which takes place under program control, the flow charts set forth in FIGS. 4–7 are provided and will be hereinafter discussed so that the basic functions of the automatic calling system as well as the manner in which they are implemented may be readily understood. It should be noted, however, that the flow charts which are hereinafter described are simplified to a great degree, consistent with the usage of flow charts as relied upon by those of ordinary skill in the art and hence reference to the Appendix should be made for the precise details of given ones of the programs relied upon for the exemplary embodiments set forth.

Figure 4:
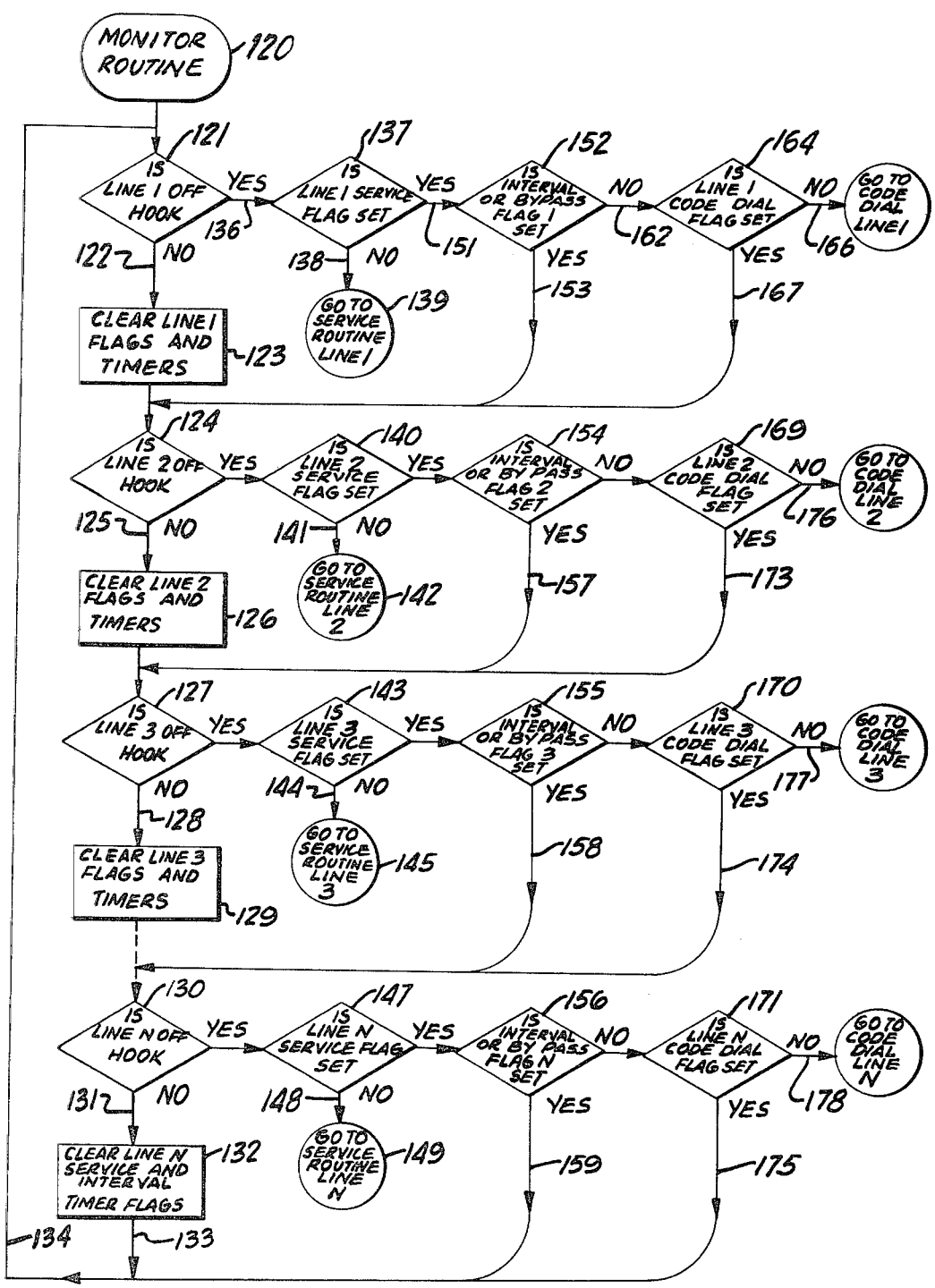
FIG. 4 is a functional flow diagram illustrating the manner in which the embodiment of this invention shown in FIG. 3 acts, under program control, to monitor a plurality of lines which may require service.

Referring now to FIG. 4, there is shown a functional flow diagram illustrating the manner in which the embodiment of the invention illustrated in FIG. 4 acts, under program control, to monitor a plurality of lines, as reflected by the condition of conductors 104A–104N in FIG. 3 which may require service and branch to appropriate modes of operation consonant with the nature of the service which may be requested. More particularly, the monitor routine illustrated in FIG. 4 is entered at the location indicated by the oval 120 and it should be noted that this routine is the basic routine in which the microprocessor means 93 operates in unless called to perform another task and, in addition, it is this routine to which the microprocessor means 93 returns while awaiting the completion of other tasks or timing routines being performed under program control. It should also be noted that the monitor routine effectively acts to check the on-hook or off-hook condition of each of the telephone lines 2A–2N being serviced, as reflected by the condition of conductors 104A–104N. If the condition reflected on the conductors 104A–104N is such that no service is required, i.e., the line is in an on-hook condition, it immediately proceeds to clear all registers associated with that line and then moves to check the next line in sequence. Conversely, if service may be required, the monitor routine next checks at various stages to ascertain the various types of service which may be required for that line. If service is required for the line, branching to the appropriate service routine occurs while if no service is then required, the monitor routine proceeds to check the condition of the next line in sequence and the various status conditions thereof are again sequentially tested for the next line. The monitor routine is thus highly repetitive with regard to each of the checks performed for each line and is always returned to when the processor is not busy conducting a service routine so that the processor is not burdened by waiting for timing intervals to be completed.

Upon entry into the monitor routine indicated by the oval flag 120, the program first checks to ascertain whether or not line 1 is in an off-hook condition as indicated by the diamond 121. Since line 1 would correspond in FIG. 3 to the condition of the telephone line 2A, the on-hook or off-hook condition thereof is simply tested by the MPU's testing of the high or low condition on conductor 104A, as supplied directly thereto by the sample and hold register means 84. If line 1 is not in an off-hook condition, as indicated by the arrow 122 annotated NO, the monitor routine proceeds to clear all line 1 flags and timers in the manner indicated by the rectangle 123 and next proceeds to perform the same functions for lines 2, 3 and N in the manner indicated by the diamonds 124, 127 and 130, the arrows 125, 128 and 131 and the rectangles 126 129 and 132. The individual line flags and timers which are cleared in association with the steps indicated by the recantangles 123, 126, 129 and 132 are flags and timers which are set in the course of the various subroutines performed and their nature will be rendered manifest in connection with a description of these routines as set forth below. Upon a completion of a testing of the conditions for line N, as indicated by the diamond 130, the arrow 131 and the rectangle 132, the subroutine returns to the beginning of the loop in the manner indicated by arrows 133 and 134 where the same steps are again repeated.

If the test indicated by the diamond 121 is affirmative, indicating that the first telephone line being monitored is in an off-hook condition as indicated by the arrow 136 annotated YES, the program next tests, as indicated by the diamond 137, to ascertain whether or not the line 1 service flag is set. The line service flag is set each time a branching operation to a line service routine for a specified line is entered. The line service routine is fully described in connection with FIG. 5 and will be described more fully in connection with this figure. Here it is sufficient to appreciate that, in essence, the line service routine is entered any time an off-hook condition is detected and the line service routine flag has not been set by a previous entry into this routine. The line service routine acts to call the necessary sub-routine for determining whether or not a tone corresponding in frequency to that selected for actuating the automatic calling system has been received, or another frequency has been received or a period has expired which is sufficient to indicate that the automatic calling system is not to respond. If the line service flag has not been set, as indicated by the arrow 138 annotated NO, the program branches to the service routine for line 1 in the manner indicated by the circular flag 139. These same steps are performed in sequence in the checks performed for lines 2, 3 and N, in the manner indicated by the diamonds 140, 143 and 147, the arrows 141, 144 and 148 annotated NO and the circular flags 142, 145 and 149.

If the line service flag has been set, in the manner indicated by the arrow 151 annotated YES, it is indicative that the lines service routine for that line has previously been entered and hence an actuating tone has not been entered and the tone entered is indicative that a normal call is being made, or the interval for the receipt of an actuating tone has expired or the system has already dialed the telephone number for the local computer and is awaiting the expiration of the appropriate pause for purposes of subsequently dialing the subscriber's billing code information. Under these circumstances, the program first tests, in the manner indicated by the diamond 152, to ascertain whether or not a bypass or interval flag has been set. The bypass flag is set in the course of the line service routine under circumstances where the tone received by the system is not the actuating tone and is indicative that a normal call is being made. The interval timer is set when no appropriate tone is received within the period specified for the receipt of a tone by the automatic calling system. Thus, if the interval flag is set for line 1, it is clear that an off-hook condition has been ascertained, the line service routine has been entered and a period has expired in which some tone should have been received on the line for purposes of evaluation by the program. However, as no tone has been received during this interval, the parameters of the program have determined that the off-hook condition should now be ignored and the line treated as if it were in an on-hook condition. Thus, if an interval or bypass flag is set, in the manner indicated by the arrow 153 annotated YES, the monitor routine returns to the main loop wherein the condition of line 2 is tested in the manner indicated by the diamond 124.

The test associated with ascertaining the presence of the interval or bypass flags for line 1, as indicated by the diamond 152, is repeated for each line in sequence in the manner indicated by the diamond 154–156 and the arrows 157–159 annotated YES. Thus, in each case, if the presence of the interval or bypass flag is determined for a given line, the monitor routine illustrated in FIG. 4 proceeds to perform its series of checking operations for the next line in sequence to be monitored.

If the test for the interval or bypass flags for line 1 is negative, in the manner indicated by the arrow 162 annotated NO, the tests thus far performed for line 1 have indicated that line 1 is in an off-hook condition, the line service routine for line 1 has been entered, as indicated by the flag set, and entry into the line service routine has not resulted in an indication that a tone other than the desired tone has been received or that the assigned interval for the receipt of a tone upon which a decision can be made has expired. Furthermore, as it will become clear in conjunction with FIG. 5 that, once the line service routine is entered, the routine will continue looping upon itself until either a bypass flag is set to indicate a normal call is being made, the interval timer expires indicating that too long a period for a service request to be received has expired or an actuating tone is received and a call automatically dialed, it will be appreciated that a negative result from the test indicated by the diamond 152 will mean that the automatic calling system according to the present invention has automatically dialed the telephone number for the subscriber service and is either awaiting the appropriate interval to issue the subscriber's code information or has already completed dialing this information.

If the automatic calling system has already issued the subscriber's billing code information, as shall be seen in connection with FIG. 7, a code dial flag is set while, if an appropriate period for the issuance of this information has not yet expired, no flag will be set. Thus, under these conditions, the monitor routine in the branch associated with line 1 next checks, in the manner indicated by the diamond 164, to ascertain whether or not the code dial flag has been set. If the code dial flag has not been set, in the manner indicated by the arrow 166 annotated NO, the program branches to the code dial routine for line 1, as further discussed in connection with FIG. 7. However, should the code dial flag have been set, in the manner indicated by the arrow 167 annotated YES, it will be clear that line 1 is off-hook, the service routine has been entered, an actuating tone has been received, the telephone number of the local computer has been dialed and, subsequently, the subscriber's billing code information has been entered on the telephone line by the automatic calling system according to the instant invention. Thus, under these circumstances, while line 1 is off-hook it will be clear that it requires no further service and that, in all probability, a user has now contacted or is in the process of contacting a desired location and is conversing therewith. Therefore, the program returns, in the manner indicated by the arrow 167 annotated YES, to the main portion of the monitor routine to perform successive checks for each of lines 2-N and, upon the completion of such tests, continues looping back on itself.

The same tests as described for line 1, in conjunction with the diamond 164, are performed sequentially for each line, in the manner indicated by the diamonds 169-171, the arrows 173-175 annotated YES and the arrows 176-178 annotated NO. Accordingly, it will be appreciated by those of ordinary skill in the art that the monitor routine illustrated in FIG. 4 acts to test each line in sequence to ascertain whether or not the line is in an off-hook condition in the manner indicated by the diamonds 121, 124, 127 and 130. If the line is on-hook in the manner indicated by the arrows 122, 125, 128 and 131 annotated NO, the program assumes that the user has just hung up the phone and proceeds to clear all registers, flags and timers associated with that line, in the manner indicated by the rectangles 123, 126, 129 and 132 whereupon it checks the next line in sequence in the same manner and, thereafter, loops back on itself, in the manner indicated by the arrow 134, to continue the sequential checking operation.

When any line is determined to be in an off-hook condition, the program proceeds to ascertain whether or not the line has been previously serviced in the manner indicated by the diamonds 137, 140, 143 and 147. If the line has not been previously serviced, as indicated by the condition of the service flag associated with that line, the program branches to the line service routine for that line, in the manner indicated by the circular flags 139, 142, 145 and 149.

The line service routine for each line, as will be more fully described in connection with FIG. 5, once entered upon a detection of an off-hook condition for that line stays active until one of three possible conditions are ascertained. The first condition is that a tone is received which does not correspond to the actuation tone specified for the automatic calling system according to the instant invention in which case a determination is made that a user is using the phone line for a normal call. Under these conditions, a bypass flag is set and the automatic calling system will not be actuated for this line. A second possible condition is that no tone has been received and a predetermined interval has expired such that the program assumes that no tone will be forthcoming. Under these conditions, an interval flag is set for the line. When either the interval or bypass flags are set through the tests associated with the diamonds 152 and 154-156, the monitor routine will ignore the off-hook condition of the line until the line subsequently goes on-hook and these flag conditions are cleared in the manner indicated by the rectangles 123, 126, 129 and 132. If the line service routine for a given line does not cause a setting of the interval or bypass flags, the third condition is present in which an actuating tone is detected and the phone number for the computer controlling the subscriber's service is automatically issued. Since this completes the first phase of the operation of the automatic calling system, the monitor routine is returned to while the program sequence for that line awaits the expiration of a period appropriate for its issuance of subscriber's billing code information on the line. For this purpose, the monitor routine is returned to and, each time the loop is completed for the monitor routine, the off-hook condition of that line will be detected, together with the presence of the line service flag and the absence of an interval or bypass flag. Under these circumstances, the program checks to ascertain, in the manner indicated by the diamonds 164 and 169-171, whether or not a code dial flag is set. If the flag is set, it is indicative that billing code information has already been dialed by the system. However, if the same has not been set, as indicated by the arrows 166 and 176-178 annotated NO, the program branches to the code dial routine which is depicted in FIG. 7. In this routine, as will be described in greater detail below, a timer is checked and, if the same has expired, code information defining the subscriber's billing code is issued on the appropriate telephone line and the code dial flag is set. However, if the interval of waiting has not been completed, a return to the monitor routine, illustrated in FIG. 4, occurs so that the microprocessor is not tied up during the waiting interval.

Figure 5:
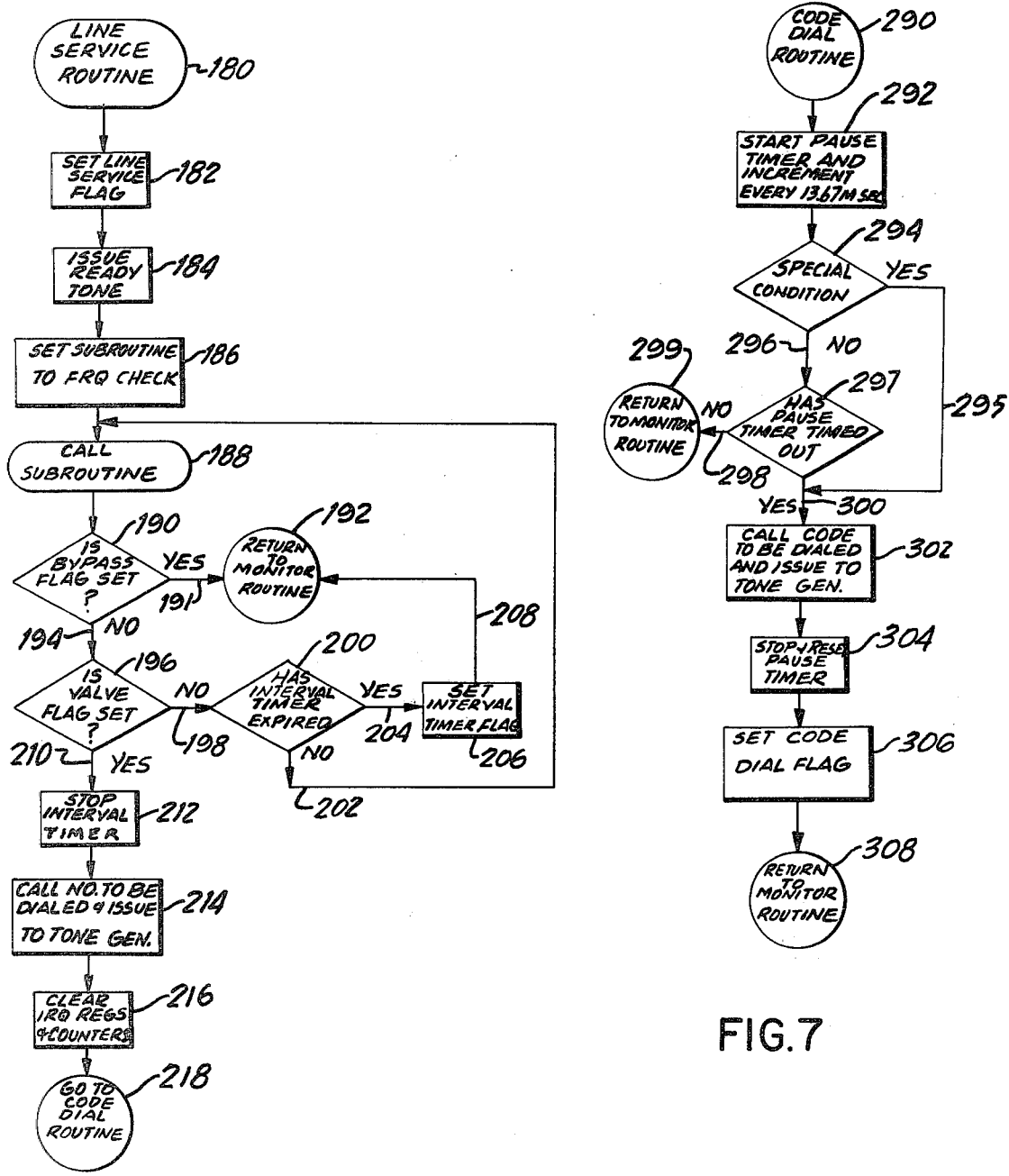
FIG. 5 is a functional flow diagram illustrating the operation, under program control, of the embodiment of this invention shown in FIG. 3 according to a main line service routine.

Referring now to FIG. 5, there is shown a functional flow diagram illustrating the operation, under program control, of the embodiment of this invention shown in FIG. 3 according to a main line service routine. The main line service routine illustrated in FIG. 5 is entered in the manner indicated in FIG. 4 by the circular flags 139, 142, 145 and 149 and it will be appreciated by those of ordinary skill in the art that this routine is entered on the basis of the line being serviced at the given time and all flags and timers set thereby are defined for the line for which entry occurred. When the line service routine illustrated in FIG. 5 is entered at the location indicated by the oval flag 180, the program immediately acts, in the manner indicated by the rectangle 182, to set the line service flag for the line causing entry so that, from this point on, any branch in the monitoring routine associated with an off-hook condition for this line will reflect that the line has already been subjected to a line service routine. Thereafter, the microprocessor is caused to issue a digital code to cause the tone generator 94 to issue a ready tone on the line, in the manner indicated by the rectangle 184, to advise the user that the automatic calling system is available for use. This ready tone should take the form of a tone to which the telephone system would not respond and hence could typically take the form of a row 4 ($B_4$) tone from the DTMF pad. This tone would typically be issued on the basis of one millisecond on and one millisecond off for a few cycles and it is from this instant that the interval timer, to be described hereinafter, is started whereupon a user has a specified interval to insert an actuation tone at the handset or else the automatic calling system according to the instant invention assumes that it is not to be employed and ignores future tones placed on the line.

The line service routine next sets the subroutine pointer to the frequency check subroutine, in the manner indicated by the rectangle 186. The frequency check subroutine is described in connection with FIG. 6 in great detail. Here, however, it is sufficient to appreciate that the frequency check subroutine acts to start an interval timer and stays in a loop counting a two second interval in which the user is permitted to respond to the automatic calling system according to the instant invention or be ignored. In addition, the frequency check subroutine acts to set an interrupt handler to a count routine wherein interrupts being generated for the line being serviced by one of the interrupt request flip-flops 88A-88N, as shown in FIG. 3, are counted over fixed periods to determine the frequency of tones present on the off-hook line. If two frequencies which do not correspond to the activation tone are found before eight frequencies which correspond to this tone are determined, a bypass flag is set. However, if eight frequencies corresponding to the activation tone are located prior to detecting two frequencies not corresponding to the tone, it is assumed that the activation tone is present and the line service routine is returned to to initiate an automatic dialing operation in a manner to be described hereinafter.

With the housekeeping functions associated with rectangles 182, 184 and 186 complete, the line service routine, illustrated in FIG. 5, next acts in the manner indicated by the oval flag 188 to call the frequency check subroutine set in association with the program step indicated by the rectangle 186. The frequency check subroutine acts, as briefly described above, to set an interval timer and process any interrupts which occur in a manner to ascertain whether or not a tone present on the line is the tone employed to actuate the automatic calling unit. If a tone other than the designated tone is ascertained as present on the line, a bypass flag is set while, if the actuation tone is ascertained as present, a value flag is set. Once the interval timer times out, the interval flag is set. The manner in which this is done will be described below in connection with the description of FIG. 6. Here, however, it is sufficient to appreciate that these flags are set and are employed in the remaining portions of the line service subroutine illustrated in FIG. 5 to determine the action of the automatic calling system illustrated in FIG. 3.

More particularly, once the frequency check subroutine is called, in the manner indicated by the oval flag 188, the program next checks, in the manner indicated by the diamond 190 to ascertain whether or not the bypass flag for the line being serviced has been set by the frequency check subroutine. If the bypass flag has been set, in the manner indicated by the arrow 191 annotated YES, it is indicative that a tone has been entered on the line which does not correspond to the activation tone or frequency for the automatic calling system. Therefore, it is assumed that the user is employing the telephone line for purposes of an ordinary call and a return to the monitor routine, in the manner indicated by the circular flag 192, occurs. Under these circumstances, it should be noted that the monitor routine will effectively ignore what is occurring on the off-hook line associated with this line service routine until such time as the line goes on-hook and the registers and flags are reset.

If the test associated with the diamond 190 is negative, in the manner indicated by the arrow 194 annotated NO, this subroutine next tests, in the manner indicated by the diamond 196 to ascertain whether or not a value flag has been set for the line being serviced. The value flag is set by the frequency check subroutine when the same has ascertained that the activation tone assigned to the automatic calling system is present and hence that an automatic calling operation is to be initiated under software control. If the test associated with the diamond 196 is negative, in the manner indicated by the arrow 198 annotated NO, it will be manifest that no frequency determination with respect to anything which may be on the activated telephone line has been made. Therefore, the program next tests, in the manner indicated by the diamond 200, to ascertain whether or not the interval timer which is maintained, as aforesaid, by the frequency check subroutine for the line being serviced has expired. If the interval timer has not yet expired, in the manner indicated by the arrow 202 annotated NO, it will be apparent that the frequency check subroutine has had insufficient information or time to make any determination and hence the program loops back, in the manner indicated by the arrow 202, to continue checking for the presence of a condition, as determined by the frequency check subroutine, wherein a bypass, value or interval timer expired condition is indicated. Since, as shall be seen in connection with FIG. 6, the interval timer is set to expire in approximately two seconds after the ready tone associated with the rectangle 184 is issued, processing within this loop without the receipt of a tone can only continue for approximately two seconds. The presence of a frequency causing the setting of a bypass or value flag will occur within fifty milliseconds of when the tone is placed on the line.

Should the test associated with the diamond 200 be affirmative, in the manner indicated by the arrow 204 annotated YES, it will be indicative that the interval timer has timed out and that the user has ignored the ready tone. Under these conditions, as indicated by the rectangle 206, the interval timer flag is set and a return to the monitor routine in the manner indicated by the arrow 208 and the circular flag 192, occurs. Under these conditions too, the monitor routine will now ignore the off-line condition associated with the line for which the interval timer was set upon a determination that the interval timer flag is present as the system assumes that, when the ready tone is ignored by a user, the automatic calling system is not be be employed.

If the test for the value flag indicated by the diamond 196 is affirmative, in the manner indicated by the arrow 210 annotated YES, it will be apparent that the frequency check subroutine has ascertained the presence of a frequency corresponding to the actuation tone of the automatic calling system. Under these conditions, as indicated by the rectangle 212, the interval timer initiated by the frequency check subroutine is stopped and, thereafter, the telephone number to be automatically dialed is called from ROM and issued by the microprocessor to the tone generator in the manner indicated by the rectangle 214. While the telephone number is thus being automatically issued by the tone generator under program control, the program next acts to clear all the frequency interrupt registers and counters which were set during the frequency check subroutine called in the manner indicated by the rectangle 216. Thereafter, the line service routine exits to the code dial routine in the manner indicated by the circular flag 218.

The code dial subroutine will be described in detail in connection with FIG. 7. Here, however, it is sufficient to appreciate that the line service routine acts to call the frequency check subroutine after issuing a ready tone to the user. The frequency check subroutine acts to establish the presence of a bypass or value condition and starts an interval timer running. The line service routine will return to the monitor routine upon the establishment of a bypass or interval timer timed out condition while, if an activating tone has been determined, it will cause a call to be automatically placed to the computer in control of the private leased line system or any other location defined and then exit to the code dial routine, illustrated in FIG. 7, to await the expiration of an appropriate interval for issuing billing code information to the contacted computer site. If none of the conditions tested for by the diamonds 190, 196 and 200 is present, looping within the line service routine occurs until such time as the frequency check subroutine makes one of the determinations appropriate for causing the program to leave the loop.

Figure 6:
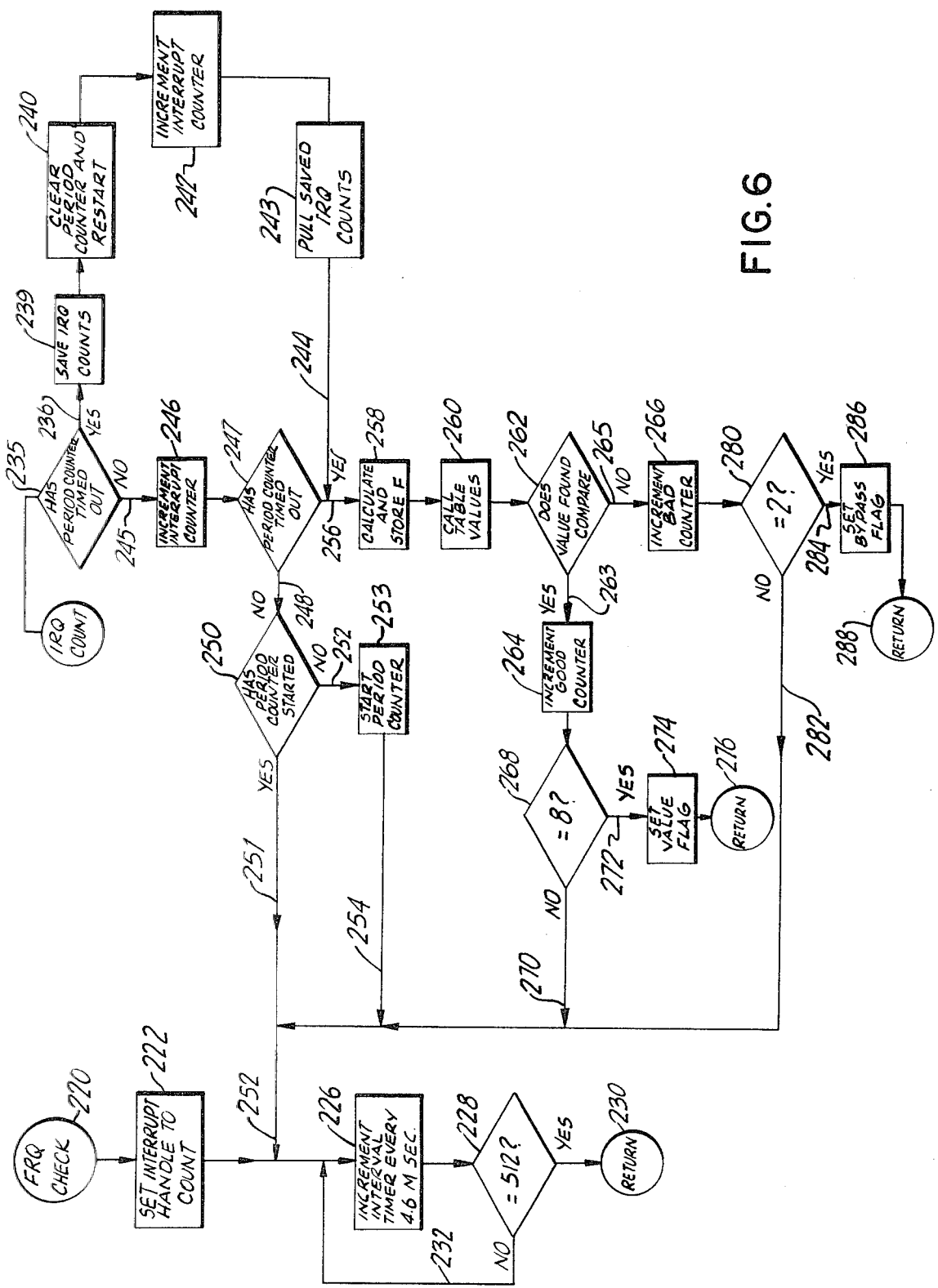
FIG. 6 is a functional flow diagram illustrating the manner in which the presence of an enabling frequency is determined, under program control, in the embodiment of the invention illustrated in FIG. 3.

Referring now to FIG. 6, there is shown a functional flow diagram illustrating the operation of the frequency check subroutine in accordance with the teachings of the instant invention. When the frequency check subroutine is called by the line service routine, illustrated in FIG. 5, it is entered at the location of the circular flag 220 and initially acts to set the interrupt handler to count in the manner indicated by the rectangle 222. Thereafter, each interrupt generated by one of the interrupt flip-flops 88A-88N for the line being serviced is processed in accordance with the portion of the subroutine indicated by the oval flag 224 annotated INTERRUPT COUNT. Thereafter, the frequency check subroutine acts, in the manner indicated by the rectangular 226 to increment the interval timer which is a software timer every 4.6 milliseconds. After the interval timer is incremented, the program tests, in the manner indicated by the diamond 228, to ascertain whether or not the state of the interval timer is five hundred and twelve. A state of five hundred and twelve in the interval timer corresponds to the expiration of the two second interval during which a user must respond to the ready tone issued in accordance with the step indicated by rectangle 184 in the line service routine. Whenever the state of the interval timer corresponds to five hundred and twelve, the program returns to the calling routine in the manner indicated by the circular flag 230. However, if the test associated with the diamond 228 is negative, in the manner indicated by the arrow 232 annotated NO, looping back for further incrementing of the interval timer occurs.

Whenever an interrupt is generated by one of the interrupt request flip-flops 88A-88N serving the line for which the line service routine was initiated, it is processed in accordance with the portion of the frequency check routine indicated by the interrupt count flag 224. More particularly, when an interrupt is received by the microprocessor means 93, the program initially checks, in the manner indicated by the diamond 235, to ascertain whether or not the period counter has timed out. The period counter is a sixteen millisecond timer which is employed for the purposes of the interrupt counting routine to determine fixed periods of sixteen milliseconds for purposes of calculating, under software control, the frequency at which interrupts are received. Basically, as shall become apparent below, this counter is started and stopped by the interrupt counter routine now being discussed and the number of interrupts received during each sixteen millisecond period are also counted. The program then calculates the frequency of the interrupts by dividing the number of interrupts received by sixteen milliseconds to determine the frequency.

If the period counter has timed out, in the manner indicated by the arrow 236 annotated YES, the program next acts, in the manner indicated by the rectangle 239 to save the stored count of the interrupt counter, so that the frequency of the interrupts counted in the previous period may be calculated. Thereafter, the program acts in the manner indicated by the rectangle 240, to clear the period counter and restart it. This occurs, as will be apparent to those of ordinary skill in the art, since it is clear that the instant interrupt received is to correspond in time to the initiation of a new counting period. The interrupt counter is then incremented in the manner indicated by the rectangle 242. The interrupt counter is another software counter which is maintained for the purposes of counting the number of interrupts received by the microprocessor during each sixteen millisecond period which the interrupt count subroutine employs for the purposes of calculating frequency. Once the interrupt counter is incremented, in the manner indicated by the rectangle 242, the program accesses the interrupt count stored in connection with the step indicated by rectangle 239, in the manner indicated by the rectangle 243, and reenters the main portion of the routine, in the manner indicated by the arrow 244, where, as shall be seen below, the frequency is calculated, and conditions are checked to ascertain if a decision can be made or further interrupts must be counted.

If the period counter has not timed out, in the manner indicated by the arrow 245 annotated NO, it is clear that the instant interrupt which is being processed is merely to be counted. Thus, as indicated by the rectangle 246, the interrupt counter is incremented. Upon incrementing the interrupt counter, in the manner indicated by the rectangle 246, the program next tests, in the manner indicated by the diamond 247, to ascertain whether or not the period timer has now timed out. If the period counter has not timed out, in the manner indicated by the arrow 248 annotated NO, the program next tests to ascertain whether or not the period counter has been started in the manner indicated by the diamond 250. If the period counter has already started, in the manner indicated by the arrow 251 annotated YES, all that is necessary is that the instant interrupt being processed be counted in the manner already accomplished in association with the step indicated by the rectangle 246 and hence the program returns to an incrementing of the interval timer, in the manner indicated by the arrow 252, to await receipt of the next interrupt to be processed. If the interrupt counter has not been started, in the manner indicated by the arrow 252 annotated NO, the instant interrupt being processed is the first interrupt for the first period and hence the period counter is started in the manner indicated by the rectangle 253. Thereafter, in the manner indicated by the arrows 254 and 252, a return to an incrementing of the interval timer occurs while the interrupt count routine awaits the receipt of the next interrupt to be processed.

If the period counter has timed out, in the manner indicated by the arrow 256 annotated YES, the last interrupt processed which has caused entry into this loop is the last interrupt to be counted within the sixteen millisecond period which has been initiated. It should be noted that timing out has here occurred between the tests associated with the diamonds 240 and 247 or this point in the main routine is being entered with the saved counts associated with rectangle 243 so that in either event the frequency of the interrupts counted must now be calculated. Thus, as indicated by the rectangle 258, the frequency of the interrupts counted during this last period are calculated by dividing the number of interrupts counted by the sixteen millisecond period during which counting occurred and the frequency thus calculated is stored in memory. Thereafter, the program calls, as indicated by the rectangle 260, the table value from memory which corresponds to the actuation frequency for the automatic calling system. It should be noted at this juncture that, were it desired that the automatic calling system respond differently to several tones, each of the requisite activation tones would be stored in memory and called for subsequent comparison.

Once the value for the actuation frequency for the automatic calling system is called, in the manner indicated by the rectangle 260, the program next checks, in the manner indicated by the diamond 262, to ascertain whether or not the value of frequency calculated and stored in connection with the program step, indicated by the rectangle 258, compares with the actuation frequency for the system called from memory in connection with the rectangle 260. If the value does, in fact, compare, in the manner indicated by the arrow 263 annotated YES, a counter maintained for the purposes of counting the number of good comparisons obtained for each sixteen millisecond interval, during which increments are counted, is incremented in the manner indicated by the rectangle 264. However, if no comparison is obtained, in the manner indicated by the arrow 265 annotated NO, a counter maintained for the purposes of counting the number of times no comparisons were obtained for sixteen millisecond counter periods is incremented in the manner indicated by the rectangle 266.

The interrupt count routine, indicated by the circular flag 224, employs the counts maintained by the good and bad counters associated with the incrementing steps of rectangles 264 and 266 to ascertain whether or not a user is initiating an automatic dialing operation or is merely using the telephone line in a normal mode of calling by checking to ascertain whether or not two frequencies not corresponding to an acuation frequency for the system are received prior to the receipt of eight frequency determinations which correspond to the selected actuation frequency. This is done by testing the state of the counter just incremented to ascertain whether either condition is present. More particularly, when the good counter is incremented, in the manner indicated by the rectangle 264, the program next tests, in the manner indicated by the diamond 268, to ascertain whether or not the state thereof corresponds to eight equaling the requisite receipt of eight periods during which an actuation frequency was received. If the result associated with the test indicated by the diamond 268 is negative, in the manner indicated by the arrow 270 annotated NO, further counting of subsequent interrupts must take place as sufficient information requisite to further processing outside this loop has not occurred. Therefore, as indicated by the arrows 270 and 252, a return to an incrementing of the interval timer occurs to await the further receipt of interrupts to be counted during succeeding sixteen millisecond periods. However, if the results of the test associated with the diamond 268 is affirmative, as indicated by the arrow 272 annotated YES, it is clear that sufficient interrupts have been counted over a sufficient number of sixteen millisecond periods to ascertain the eight frequency determinations associated with the activation frequency for the automatic calling system have been received. Therefore, as indicated by the rectangle 274, the value flag is set and a return to the calling line service routine is initiated in the manner indicated by the circular flag 276. It will be recalled, from a description of FIG. 5, that when a value flag is detected as set by the portion of the line service routine associated with the diamond 196, the local telephone number for the computer controlled switching system is automatically dialed.

When the bad counter has been incremented, in the manner indicated by the rectangle 266, the program next tests, in the manner indicated by the diamond 280, to ascetain whether or not the state of the bad counter corresponds to two. If the state of the bad counter is not yet two, the requisite conditions for determining the presence of the use of the telephone line for normal purposes is not present. Accordingly, as indicated by the arrow 282 annotated NO, a return to an incrementing of the interval timer occurs to await the receipt of further interrupts to be counted during further sixteen millisecond periods. However, if the test associated with the diamond 280 is affirmative, in the manner indicated by the arrow 284 annotated YES, it is clear that two frequencies not corresponding to the activation tone for the automatic calling system have been received prior to the receipt of eight frequencies corresponding to the activation tone. Under the criterion for the system established, this is determinative that the telephone line is being employed for the purposes of making a normal call. Under these circumstances, as indicated by the rectangle 286, the bypass flag is set and, thereafter, a return to the calling line service routine is initiated as indicated by the circular flag 282. It will be recalled that the line service routine, upon a detection that the bypass flag is set in connection with the test associated with diamond 190, returns to the calling monitor routine and, in addition, the monitor routine, upon a determination that the bypass flag is set, acts to ignore what is occurring on the line being monitored.

The frequency check subroutine, illustrated in FIG. 2, will act to ascertain whether or not the bypass flag or the value flag is to be set within approximately fifty milliseconds of the appearance of a tone on the telephone line as entered by the user. Absent the appearance of such a tone, the interval timer will time out within approximately two seconds of the issuance of the ready tone by the system. Thus, under a worse case condition, the frequency check subroutine illustrated in FIG. 6 will complete its functions within a two second interval. Should such two second period be determined to tie up the processor for too long, a variation in the programing techniques could be employed to foreshorten the interval associated with the interval timer and the attendant tying up of the processor. For instance, the interval timer could be incremented in a separate subroutine and the condition of this timer merely checked and, each time it is determined that the same has not yet timed out, a return to the monitoring routine could occur to await the receipt of further interrupts to be counted. Alternatively, the monitoring routine and line service routine could be modified so that the operator holds down the tone keys and, once this is detected by the program, a response tone is issued and the operator is given a shorter interval such as one second to release the actuation keys. Thus, with this approach, the tying up of the processor is reduced to one-half the interval associated with the instant program and, since an actuation of the line routine is not initiated until the user actually enters an activation code, a reduction in the number of program steps involved could also be achieved.

Referring now to FIG. 7, there is illustrated the code dial routine. The code dial routine illustrated in FIG. 7 is entered, in the manner indicated in FIG. 5, after the line service routine has automatically dialed the telephone number of the computer center which controls the leased line system in the manner indicated by the circular flag 218. Furthermore, as will readily be appreciated, the function of the code dial routine is to await the expiration of an appropriate period, after the computer location has been automatically called, for the computer center to answer automatically. Once this has been done, the code dial routine functions to automatically dial tone information on the telephone line which corresponds to the subscriber's billing code so that this burden too may also be removed from a user of the system. Thereafter, the operator is advised to dial the area code and phone number of the site to be contacted.

The code dial routine is entered at the location indicated by the circular flag 290 and initially acts to start a software timer generally referred to as the pause timer and cause the same to be incremented every 13.67 milliseconds or at some other convenient interval as available from the system clock and various divisions thereof as indicated by the rectangle 292. The pause timer is the seven second timer which is started at the completion of the line service routine after the telephone number for the controlling computer has been issued. The function of the pause timer is to allow the expiration of an appropriate interval for the computer which has been contacted to answer the telephone and issue a ready tone on the line. This, typically, requires six to seven seconds before the computer is in a condition to receive such proper billing code information and hence the pause timer acts to time this interval so that the program may assume, at the expiration of such seven second interval, that the computer controlling the contacted site has answered the line and that subscriber billing information may be issued thereto. It should be appreciated that, as a user is monitoring the line, the program need not detect the ready tone or other handshaking tone issued by the computer contacted since, if the computer location provides a busy signal, the user may be expected to hang up the handset.

After the pause timer is started and incremented under program control every 13.67 milliseconds, the program next tests, in the manner indicated by the diamond 294, whether or not a special condition is present. The special condition here contemplated is a user bypass feature wherein the operator actually hears the ready tone issued by the contacted central computer before the pause timer has timed out and again enters an activation code or the like from the handset. This tone is detected and acts to set a flag which, when ascertained by the test associated with the diamond 294, will cause the program to stop waiting for the pause timer to time out and will cause billing code subscriber information to be immediately issued in a manner to be described below. The condition where a special condition is ascertain by the test associated with the diamond 294, as indicated by the arrow 295 annotated YES, is one where the operator hears the ready tone issued by the computer and answers a code at the handset which defines the special condition. A detection of this tone is defned as a special condition and it will be appreciated that this causes looping about the next test present in the program as associated with the diamond 297.

If no special condition is ascertained, in the manner indicated by the arrow 296 annotated NO, the program next tests, in the manner indicated by the diamond 297, to ascertain whether or not the seven second pause timer has timed out. If the pause timer has not timed out, in the manner indicated by the arrow 298 annotated NO, the code dial routine returns to the monitor routine in the manner indicated by the circular flag 299. This is done to avoid tying up the microprocessor for the seven second interval associated with the pause timer. However, it should be noted from a review of the monitor routine illustrated in FIG. 4, that each time a line has been serviced to the point that the telephone number of the computer controlling the private leased line system has been dialed, the monitor routine, when checking that line, will immediately proceed to reenter the code dial routine since the tests associated with diamonds 164, 169, 170 and 171 will, in each case, be negative.

If the pause timer has timed out, in the manner indicated by the arrow 300 annotated YES, or, if a special condition has been detected, in the manner indicated by the arrow 295, subscriber billing code information is called from memory and issued to the tone generator means 94 by the microprocessor in the manner indicated by the rectangle 302. In addition, a further ready tone may be issued by the microprocessor through the tone generator after the last digit tone associated with subscriber's billing information has been issued to advise the user that the area code and local phone number of the location which is sought to be contacted may now be entered. Thereafter, the pause timer is stopped and reset in the manner indicated by the rectangle 304 and the code dial flag is set in the manner indicated by the rectangle 306 so that when this line is next tested by the monitoring routine, the tests associated with diamonds 164, 169, 170 and 171 will be affirmative whereupon the monitor routine will automatically step to the initial test for the next line in sequence. Thereafter, the program returns to the monitor routine as indicated by the circular flag 308.

While the embodiment of the invention disclosed in conjunction with FIGS. 3–7 contemplates a mode of application wherein the automatic dialing function is directed specifically to automatically contacting the computer site controlling a private line, long distance switching system, it will be appreciated that any location may be similarly contacted and that the embodiment illustrated may be simply modified to perform a plurality of additional functions. Thus, for instance, since seven independent, transparent telephone codes may be generated at a DTMF pad which differ in frequency and additional automatic dialing information may be provided to the microprocessor by simply adding such information to the read only memory, the automatic calling system, as disclosed in conjunction with FIGS. 4–7, may be readily be adapted to dial up to seven specified telephone numbers in an automatic manner under circumstances where the selection is coded by the user at the DTMF pad. Furthermore, many more selections may simply and easily be provided by using pairs of depressions and where more than one initiation code is employed, various numbers may be automatically dialed both instead of contacting the computer and also after the computer is contacted as an additional sequence of automatically generated tones. It should also be noted that, while certain software techniques associated with the frequency check routine, were developed from the standpoint of looking for a known frequency, equally successful crosspoint techniques which are based on determining what frequency is present may be employed instead or alternatively the time intervals between interrupts could be utilized to determine frequency as the tones here being employed are relatively simple to determine. Certain of these techniques are disclosed, for instance, in U.S. application Ser. No. 921,742 which is directed to Telephone Polling Apparatus as filed on July 3, 1978 in the names of David S. Bower and Fred J. Smith. The software approach, which is used in each case, would vary as a function of how many frequencies are being detected, it being noted that, if a few selected frequencies are to be ascertained, the approach of the instant application is preferred since it is simpler and cheaper to look for known frequencies while, if a large number of frequencies are present, a zero crossing technique, which actually ascertains what frequency is present, would be more desirable.

Similarly, while the disclosure of the embodiment illustrated in FIGS. 3–7 has proceeded upon the basis that the monitor routine is established for the purposes of looking for lines which go off-hook and, thereafter, the system searches for an actuation tone, an alternate approach is available, where the monitor routine would be actuated by receipt of an actuation tone per se. Under these circumstances, the microprocessor would issue a tone back to the user and the user would be given a fixed interval to respond by either releasing the tone buttons which are depressed or inserting another tone to confirm that the automatic calling system according to the instant invention is to be activated. Such an approach may be more desirable where the designer of the system seeks to reduce the time in which the processor is tied up by waiting for a predetermined interval for receipt of the ready tone to expire. Alternately, as will be apparent to those of ordinary skill in the art, timing associated with the interval timer could be carried on as a function of periodic checks which result in branching back to the monitor routine each time it is ascertained that the timer associated with a particular line has not timed out and no other flags to cause other operations have occurred.

It will thus be seen that the instant invention provides automatic calling systems and methods therefor which greatly facilitate the use of subscriber leased line systems or the like which are operated through a switched line telephone network which must be initially contacted by user insertion of a plurality of digits. Furthermore, not only is the imposition associated with contacting such systems greatly reduced by the instant invention but, in addition thereto, the entire system is utterly transparent to the local telephone system and is not capable of interfering therewith. In addition thereto, the same may be simply and easily installed at a user's site without interfering, to any substantial degree, with equipment which is already in place. The system additionally provides enhanced security for the subscriber's system in that users thereof need not know access or billing code information associated with using the private line system and use thereof will be enhanced by the convenient modes of access provided by the instant invention.

Although the present invention has been disclosed in conjunction with several specific embodiments thereof, various alternatives and modifications to the specific structure set forth herein will be obvious to those of ordinary skill in the art. For instance, a great number of modifications and variations in the specific structure disclosed, as well as the logic and programming techniques employed will occur to those of ordinary skill in the art both from the standpoint of designing specific systems for specific applications as well as utilizing cost effective approaches in the design of systems of varying sizes. Similarly, varying program techniques and features of operation are available to suit the design preferences of both the manufacturer and user.

While the invention has been described in connection with several exemplary embodiments thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. Automatic calling apparatus responsive to an actuating signal generated by any of a plurality of telephone handsets commonly connected to at least one telephone line and through said at least one telephone line to a switched telephone network for selectively initiating a calling sequence, said apparatus comprising:

input/output conductor means connected to said telephone line for receiving signal information applied to said telephone line from any of said plurality of handsets and for applying calling information to said telephone line, said input/output conductor means being connected to said telephone line in a manner to permit all signal information initially applied to said telephone line from any of said handsets to be further applied to said switched telephone network;

means connected to said input/output conductor means for determining that one of said plurality of telephone handsets connected to said telephone line has been actuated by a user;

means connected to said input/output conductor means for detecting signal information applied to said telephone line by an actuated one of said plurality of handsets for activating said automatic calling apparatus to cause said automatic calling apparatus to apply selected calling information to said telephone line; and means responsive to a detection of said signal information for activating said automatic calling apparatus for generating said selected calling information corresponding to telephone number information of a location to be contacted and applying said calling information generated to said telephone line through said input/output conductor means.

2. The automatic calling apparatus according to claim 1 wherein said means for determining takes the form of dial tone detector means responsive to an acquisition of dial tone on said telephone line.

3. The automatic calling apparatus according to claim 1 wherein said means for determining takes the form of "off-hook" detector means responsive to an "off-hook" condition on said telephone line.

4. The automatic calling apparatus according to claim 1 wherein said means for generating and applying additionally acts, subsequent to an application of said generated calling information to said input/output conductor means, to selectively generate calling information corresponding to billing code information and to apply said selectively generated calling information to said input/output conductor means.

5. The automatic calling apparatus according to claim 4 wherein said means for detecting signal information comprises transparent signal detecting means, said transparent signal detecting means being responsive to signal information on said telephone line whose presence is not acknowledged by a subsequent loss of dial tone.

6. The automatic calling apparatus according to claim 5 wherein said means for determining takes the form of dial tone detector means responsive to an acquisition of dial tone on said telephone line.

7. The automatic calling apparatus according to claim 6 wherein said means for detecting additionally comprises means for selectively providing to said means for generating and applying an indication that signal information for activating said automatic calling system has been received, said means for selectively providing being connected to said dial tone detector means and said transparent signal detecting means and selectively providing said indication to said means for generating and applying only under conditions wherein said transparent signal detecting means has detected signal information on said telephone line whose presence is not acknowledged by a subsequent loss of dial tone and dial tone has been detected both before and after said transparent signal detecting means has detected said signal information.

8. The automatic calling apparatus according to claim 1 wherein said means for detecting signal information comprises transparent signal detecting means, said transparent signal detecting means being responsive to signal information on said telephone line whose presence is not acknowledged by a subsequent loss of dial tone.

9. The automatic calling apparatus according to claim 1 wherein said signal information for activating said automatic calling system takes the form of a signal which is transparent on a telephone line in that the presence of said transparent signal on a telephone line is not acknowledged by a subsequent loss of dial tone.

10. The automatic calling apparatus according to claim 1 wherein said means for detecting signal information for activating said automatic calling apparatus comprises:

means for determining frequency of signal information applied to said input/output conductor means from a telephone line; and means for comparing said frequency determined with a reference value corresponding to said signal information for activating said automatic calling apparatus.

11. The automatic calling apparatus according to claim 10 wherein said signal information for activating said automatic calling system takes the form of a signal which is transparent on a telephone line in that the presence of said transparent signal on a telephone line is not acknowledged by a subsequent loss of dial tone.

12. The automatic calling apparatus according to claim 10 wherein said means for determining the frequency of signal information applied to said input/output conductor means comprises:

means for generating an interrupt whenever signal information applied to said input/output conductor means exceeds a predetermined threshold level;

means for counting the number of interrupts produced during a selected period; and means for calculating frequency as a function of the number of interrupts produced during a fixed period.

13. The automatic calling apparatus according to claim 10 additionally comprising:

means for applying an activation signal to said means for generating and applying whenever a comparison is obtained by said means for comparing; and means for establishing an indication that said means for generating and applying is not to be activated whenever a comparison from said means for comparing is not obtained.

14. The automatic calling apparatus according to claim 13 additionally comprising means for inhibiting an operation of said means for generating and applying if signal information is not applied to said input/output conductor means within a fixed interval after said means for determining has indicated that said telephone line has been activated by a user.

15. The automatic calling apparatus according to claim 10 wherein said means for generating and applying additionally acts, subsequent to an application of said generated calling information to said input/output conductor means, to selectively generate calling information corresponding to billing code information and to apply said selectiely generated calling information to said input/output conductor means.

16. The automatic calling apparatus according to claim 15 wherein said means for generating and applying additionally acts to issue a ready tone subsequent to generating and applying calling information corresponding to billing code information.

17. The automatic calling apparatus according to claim 16 wherein said signal information for activating said automatic calling system takes the form of a signal which is transparent on a telephone line in that the presence of said transparent signal on a telephone line is not acknowledged by a subsequent loss of dial tone.

18. Automatic calling apparatus comprising:
input/output conductor means for receiving signal information from a telephone line and for applying calling information thereto;
means connected to said input/output conductor means for determining that said telephone line has been activated by a user;
means connected to said input/output conductor means for detecting signal information for activating said automatic calling apparatus, said means for detecting signal information including means for sequentially detecting signal information on said telephone line corresponding to initial digits of a telephone number of a location to be contacted; and
means responsive to a detection of signal information for activating said automatic calling apparatus for generating calling information corresponding to telephone number information of a location to be contacted and applying said generated calling information to said input/output conductor means, said means for generating calling information being responsive to a detection of said signal information for activating said automatic calling apparatus to generate calling information corresponding to remaining digits of said telephone number of said location to be contacted.

19. The automatic calling apparatus according to claim 18 wherein said means for determining takes the form of dial tone detector means responsive to an acquisition of dial tone on said telephone line.

20. The automatic calling apparatus according to claim 19 wherein said means for sequentially detecting signal information on said telephone line is operative to detect a first one of said initial digits only after said dial tone detector means has provided an indication that dial tone has been acquired and a second one of said initial digits only after said first one of said initial digits has been detected.

21. The automatic calling apparatus according to claim 20 additionally comprising means responsive to signal information on said telephone line corresponding to digits of a telephone number exceeding said initial digits for inhibiting said means for generating.

22. The automatic calling apparatus according to claim 21 wherein said means for generating and applying additionally acts, subsequent to an application of said generated calling information to said input/output conductor means, to selectively generate calling information corresponding to billing code information and to apply said selectively generated calling information to said input/output conductor means.

23. The automatic calling apparatus according to claim 18 additionally comprising means responsive to signal information on said telephone line corresponding to digits of a telephone number exceeding said initial digits for inhibiting said means for generating.

24. Automatic calling apparatus responsive to a predetermined activating frequency from any of a plurality of telephone handsets commonly connected to at least one telephone line and through said at least one telephone line to a switched telephone network for selectively initiating a calling sequence, said apparatus comprising:
input/output conductor means for connecting to said telephone line for receiving signal information from said telephone line and for applying calling information thereto, said input/output conductor means being connected to said telephone line in a manner to permit all signal information initially applied to said telephone line from any of said handsets to be further applied to said switched telephone network;
interrupt generator means for generating output signals in response to frequency information on said telephone line, said interrupt generator means being connected to said input/output conductor means and producing an output signal each time said frequency information exceeds a predetermined threshold level;
microprocessor means responsive to output signals produced by said interrupt generator means for detecting if said output signals are occurring at a predetermined activation frequency, said microprocessor means further acting upon a detection of said predetermined activation frequency to generate output codes representing a selected telephone number to be generated; and
means responsive to said output codes generated by said microprocessor means for applying calling information representing said selected telephone number to be dialed to said input/output conductor means.

25. The automatic calling apparatus according to claim 24 wherein said microprocessor means acts to detect if said output signals are occurring at a predetermined activation frequency by counting output signals produced by said interrupt generator means during a selected period, calculating frequency as a function of the number of interrupts produced during a fixed period and comparing the frequency calculated to a reference value.

26. The automatic calling apparatus according to claim 24 wherein said predetermined activation frequency is representative of frequency information which is transparent to a telephone line in that the presence of said representative frequency information on said telephone line is not acknowledged by a subsequent resulting loss of dial tone.

27. The automatic calling apparatus according to claim 24 additionally comprising:
means for detecting if a telephone line connected to said input/output conductor means has been activated; and
means within said microprocessor means for inhibiting an operation of said means responsive if output signals from said interrupt generator means are not received within a predetermined interval.

28. The automatic calling apparatus according to claim 27 wherein said means for detecting comprises "off-hook" detecting means connected intermediate said input/output conductor means and said microprocessor means.

29. Automatic calling apparatus responsive to a predetermined activating frequency from any of a plurality of telephone handsets commonly connected to a plurality of telephone lines and through each of said plurality of telephone lines to a switched telephone network for selectively initiating a calling sequence on any of said plurality of telephone lines, said apparatus comprising:
a plurality of input/output conductor means, each of said plurality of input/output conductor means connecting to a respective one of said plurality of telephone lines for receiving signal information therefrom and for applying calling information thereto, each of said plurality of input/output conductor means being connected to a respective one of said plurality of telephone lines in a manner to permit all signal information initially applied to a selected telephone line from any of said handsets to be further applied to said switched telephone network;
a plurality of interrupt generator means for generating output signals in response to frequency information on respective ones of said plurality of telephone lines, each of said plurality of interrupt generator means being connected to a respective one of said plurality of input/output conductor means and producing an output signal each time said frequency information on respective ones of said plurality of telephone lines exceeds a predetermined threshhold level;
microprocessor means for monitoring output signals produced by each of said plurality of interrupt generator means for detecting if said output signals are occurring at a predetermined activation frequency, said microprocessor means further acting upon a detection of said predetermined activation frequency to generate output codes representing a telephone number to be generated; and
means responsive to said output codes generated by said microprocessor means for applying calling information representing said telephone number to be dialed to a one of said plurality of said input/output conductor means connected to one of said plurality of interrupt generator means at which output signals corresponding to said activation frequency occurred.

30. The automatic calling apparatus according to claim 29 wherein said microprocessor means acts to detect if said output signals are occurring at a predetermined activation frequency by counting output signals produced by said interrupt generator means during a selected period, calculating frequency as a function of the number of interrupts produced during a fixed period and comparing the frequency calculated to a reference value.

31. The automatic calling apparatus according to claim 29 wherein said predetermined activation frequency is representative of frequency information which is transparent to a telephone line in that the presence of said representative frequency information on said telephone line is not acknowledged by a subsequent resulting loss of dial tone.

32. The automatic calling apparatus according to claim 29 additionally comprising:
means for detecting if the telephone line connected to each of said plurality of input/output conductor means has been activated; and
means within said microprocessor means for inhibiting an operation of said means responsive if output signals from an associated one of said plurality of interrupt generator means are not received within a predetermined interval.

33. The automatic calling apparatus according to claim 32 wherein said means for detecting comprises "off-hook" detecting means connected intermediate each of said plurality of input/output conductor means and said microprocessor means.

34. A method of performing an automatic calling operation in response to an activating signal generated by any of a plurality of telephone handsets commonly connected to at least one telephone line and through said telephone line to a switched telephone network comprising the steps of:
providing input/output conductor means for connection to said telephone line, said input/output conductor means being provided for connection in a manner to permit all signal information initially applied to said telephone line from any of said plurality of telephone handsets to be applied through said telephone line to said switched telephone network and to said input/output conductor means;
monitoring said input/output conductor means for signal information applied to said telephone line from said plurality of handsets;
determining that said telephone line has been activated from a condition on said input/output conductor means;
detecting if signal information is present on said telephone line and said input/output conductor means for activating said automatic calling apparatus;
generating calling information corresponding to telephone number information of a location to be contacted in response to a detection of signal information on said telephone line for activating said automatic calling apparatus; and
applying said generated calling information to said input/output conductor means.

35. The method of performing an automatic calling operation according to claim 34 wherein the step of determining is performed by a monitoring of the "off-hook" condition of the telephone line.

36. The method of performing an automatic calling operation according to claim 34 wherein said step of detecting is performed by ascertaining the presence on said telephone line and on said input/output conductor means of transparent signal information whose presence on said telephone line is not acknowledged by a subsequent loss of dial tone.

37. The method of performing an automatic calling operation according to claim 34 additionally comprising the steps of:
further generating calling information corresponding to subscriber billing code information; and
applying said further generated calling information to said input/output conductor means.

38. The method of performing an automatic calling operation according to claim 34 wherein the step of determining is performed by a detection of dial tone and said step of detecting signal information for activating is performed by a detection of transparent signal information which is preceded and followed by a presence of dial tone.

39. The method of performing an automatic calling operation according to claim 34 wherein said step of detecting is performed by ascertaining the frequency of signal information applied to said input/output conductor means and comparing said frequency determined with a reference value corresponding to said signal information for activating said automatic calling operation.

40. The method of performing an automatic calling operation according to claim 39 wherein the step of ascertaining the frequency of signal information is performed by generating an interrupt whenever signal information applied to said input/output conductor means exceeds a predetermined threshold level, counting the number of interrupts produced during a selected period and calculating frequency as a function of the number of interrupts produced during a fixed period.

41. The method of performing an automatic calling operation according to claim 40 wherein the step of generating is initiated whenever a comparison is obtained.

42. A switched telephone network responsive to a plurality of predetermined signals received over a first predetermined telephone line for switching the connection of said first predetermined telephone line in response thereto;

a plurality of telephones connected to said first predetermined telephone line, each of said plurality of telephones for providing signals to said switched telephone network; and an automatic dialing unit connected in parallel with each of said plurality of telephones and to said first predetermined telephone line, said automatic dialing unit responsive to signals applied to an input terminal thereof connected to said first predetermined telephone line for providing signals at an output terminal thereof connected to said first predetermined telephone line; said input terminal and said output terminal each connected to said first predetermined telephone line at an electrically common location to enable all signals applied to said first predetermined line by any of said plurality of telephones to be provided to said input terminal of said automatic dialing unit and to said switched telephone network.

43. The combination as defined in claim 42 in which said plurality of telephones provide both at least some of said plurality of predetermined signals and another signal; and said automatic dialing unit is responsive to said another signal.

44. The combination as defined in claim 42 in which said other signal is provided by dialing an initial "1".

45. The combination as defined in claim 42 in which said telephone is a DTMF telephone and said other signal is generated by depressing at least two dial buttons simultaneously.

46. The method of performing an automatic calling operation comprising the steps of:

providing input/output conductor means for receiving signal information from a telephone line and for applying calling information thereto;

determining that said telephone line has been activated from a condition on said input/output conductor means;

sequentially detecting signal information on said telephone line corresponding to initial digits of a telephone number for a location to be contacted for activating said automatic calling apparatus from said input/output conductor means;

generating calling information corresponding to remaining digits of said telephone number in response to a detection of said signal information for activating said automatic calling apparatus; and applying said generated calling information to said input/output conductor means.

47. The method of performing an automatic calling operation according to claim 46 wherein said step of sequentially detecting signal information on said telephone line is performed by detecting a first one of said initial digits only after the presence of dial tone is ascertained and a second one of said initial digits is detected only after the presence of said first one of said initial digits has been ascertained.

48. A switched telephone network responsive to a plurality of predetermined signals in the form of a predetermined sequence of signals received over a first predetermined telephone line for switching the connection of said first predetermined telephone line to a second predetermined telephone line in response thereto;

a telephone connected to said first predetermined telephone line for providing signals to said switched telephone network; and an automatic dialing unit responsive to signals applied to an input terminal thereof for providing signals at an output terminal thereof; said input terminal and said output terminal each connected to said first predetermined telephone line so that said signals applied to said switched telephone network by said telephone are also provided to said input terminal of said automatic dialing unit, and said automatic dialing unit being responsive to an initial portion of said predetermined sequence of signals at said input terminal for providing a terminal portion of said predetermined sequence of signals at said output terminal.

* * * * *

UNITED STATES PATENT AND TRADEMARK OFFICE
CERTIFICATE OF CORRECTION

PATENT NO. : 4,332,985
DATED : June 1, 1982
INVENTOR(S) : RICHARD I. SAMUEL

It is certified that error appears in the above-identified patent and that said Letters Patent are hereby corrected as shown below:

Column 47, line 39, delete "44" and insert therefor -- 45 --.

Column 47, line 41, delete "42" and insert therefor --43--.

Signed and Sealed this

Thirty-first Day of August 1982

[SEAL]

Attest:

Attesting Officer

GERALD J. MOSSINGHOFF

Commissioner of Patents and Trademarks